US006938744B2

(12) United States Patent
Tomiyama

(10) Patent No.: US 6,938,744 B2
(45) Date of Patent: Sep. 6, 2005

(54) PISTON COUPLING MECHANISM, LOCKUP DEVICE FOR A FLUID-TYPE TORQUE TRANSMISSION DEVICE, ELASTIC COUPLING MECHANISM, AND SPRING INSTALLATION METHOD FOR AN ELASTIC COUPLING MECHANISM

(75) Inventor: Naoki Tomiyama, Hirakata (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 10/659,442

(22) Filed: Sep. 11, 2003

(65) Prior Publication Data

US 2004/0055841 A1 Mar. 25, 2004

(30) Foreign Application Priority Data

Sep. 25, 2002 (JP) ....................................... 2002-278885
Sep. 25, 2002 (JP) ....................................... 2002-278886
Sep. 25, 2002 (JP) ....................................... 2002-278887

(51) Int. Cl.[7] ................................................ F16H 45/02
(52) U.S. Cl. ....................................... 192/3.29; 192/212
(58) Field of Search ................................. 192/3.29, 3.3, 192/55.61, 70.17, 70.18, 85 AA, 200, 212, 30 V

(56) References Cited

U.S. PATENT DOCUMENTS 4,353,444 A * 10/1982 Bionaz ...................... 192/3.29
5,667,043 A * 9/1997 Dehrmann et al. ........ 192/3.29
5,682,969 A * 11/1997 Ling ......................... 192/3.29
5,732,804 A * 3/1998 Wienholt ................... 192/3.29
5,947,243 A * 9/1999 MacDonald ............... 192/3.29
6,016,894 A * 1/2000 Kundermann ............... 192/3.3
6,745,563 B1 * 6/2004 Shue ........................... 60/345
2001/0011621 A1 * 8/2001 Bauer et al. ............... 192/3.29
2001/0052443 A1 * 12/2001 Tomiyama et al. ........ 192/3.29

FOREIGN PATENT DOCUMENTS

JP 10-047453 A 2/1998

* cited by examiner

*Primary Examiner*—Rodney H. Bonck
(74) *Attorney, Agent, or Firm*—Shinjyu Global IP Counselors, LLP

(57) ABSTRACT

A lockup device 7 is provided with a clutch mechanism, an elastic coupling mechanism, a piston 75, and a piston coupling mechanism 76. The piston coupling mechanism 76 has a piston pilot 78 and a return plate 79 and serves to couple the piston 75 and a front cover 11. The piston pilot 78 is fixed to the front cover 11 and supports the piston 75. The axially deformable return plate 79 is disposed between the front cover 11 and the piston 75. The elastic coupling mechanism is provided with a plurality of torsion springs 73, a spring holder 71, a driven plate 72, and a drive plate 74. A plurality of slit holes 71*d* each having a width that is larger than the width W1 of the first claw parts 72*b* are formed in the annular part 71*a* at positions corresponding to those of the first claw parts 72*b*.

6 Claims, 16 Drawing Sheets

PISTON COUPLING MECHANISM, LOCKUP DEVICE FOR A FLUID-TYPE TORQUE TRANSMISSION DEVICE, ELASTIC COUPLING MECHANISM, AND SPRING INSTALLATION METHOD FOR AN ELASTIC COUPLING MECHANISM

BACKGROUND OF THE INVENTION

1. Field of the Invention

The present invention relates to a piston coupling mechanism. More specifically, the present invention relates to a piston coupling mechanism, a lockup device for a fluid-type torque transmission device, an elastic coupling mechanism, and a spring installation method for an elastic coupling mechanism.

2. Background Information

One example of a fluid-type torque transmission device is a torque converter, which is a device that serves to transmit torque from an engine to a transmission by means of a fluid contained inside the torque converter. A conventional torque converter chiefly has a front cover, impeller, a fluid chamber, a turbine, and a stator. Torque is delivered from an engine to the front cover. The impeller is fixed to the transmission side of the front cover and forms a fluid chamber. The turbine is arranged to face the engine side of the impeller and is capable of outputting torque to the transmission. The stator is arranged between an inner circumferential part of the impeller and an inner circumferential part of the turbine and is capable of directing the flow of the operating fluid from the turbine toward the impeller. This kind of torque converter is often provided with a lockup device.

The lockup device is arranged in the space between the turbine and the front cover and serves to transmit torque directly from the front cover to the turbine by mechanically coupling the front cover and the turbine together. The lockup device is provided with a circular disc-shaped piston that can engage with and disengage from a friction surface of the front cover by being pressed thereagainst, and an elastic coupling mechanism to transmit torque between the piston and the turbine. A friction coupling part having a friction facing attached thereto is formed on an outer circumferential part of the piston in such a manner as to face the friction surface of the front cover.

Lockup devices having two friction surfaces in order to increase the torque transmission capacity have already been proposed. One such lockup device having two friction surfaces is provided with a clutch mechanism, a piston, and an elastic coupling mechanism. The clutch mechanism has a friction coupling part that can be pressed against a friction surface of the front cover. The piston can push the friction coupling part toward the front cover. The elastic coupling mechanism is fixed to the turbine and serves to couple elastically the turbine and the clutch mechanism together in the rotational direction. Since it is necessary to transmit torque directly from the front cover to the piston when the lockup device is in the locked state, this kind of lockup device is provided with a piston coupling mechanism that couples the piston and the front cover together such that the piston and front cover are non-rotatable and axially moveable relative to each other.

One such piston coupling mechanism involves attaching the piston to the front cover with a plurality of flat springs arranged along a rotational direction. More specifically, one end of each flat spring is fixed with rivets or bolts to a base plate that is fixed by welding or the like to the front cover and the other end of each flat spring is fixed to the piston with rivets or bolts. Thus, the piston can rotate integrally with the front cover and can move axially with respect to the front cover as shown in Japanese Laid-open Patent Publication 10-47453, which is hereby incorporated by reference.

One kind of elastic coupling mechanism provided in a lockup device like that just described is provided with a plurality of coil springs, a first rotary member, a second rotary member, and a third rotary member. The plurality of coil springs is arranged along a rotational direction of the lockup device. The first rotary member is arranged on an axially facing side of the coil springs and serves to support one axially facing side and the radially outward side of the coil springs. The second rotary member is fixed to the first rotary member and supports the rotationally facing ends of the coil springs. The third rotary member supports the rotationally facing ends of the coil springs and is provided in such a manner that it can rotate relative to the first rotary member and second rotary member. The first rotary member is provided with notches or cut-and-raised parts for supporting the rotationally facing ends of the coil springs. When the first rotary member and second rotary member are fixed together, they support the radially inwardly facing side and the other axially facing side of the coil springs.

With this elastic coupling mechanism, the springs are assembled by first arranging the springs using the notches or cut-and-raised parts of the first rotary member and then fixing the second rotary member to the first rotary member.

In a piston coupling mechanism like that just described, the flat springs are fixed to the piston and the front cover using rivets or bolts. Consequently, the piston coupling mechanism has a relatively large number of parts and its assembly requires a large number of man-hours.

Also, in a piston coupling mechanism like that just described, the flat springs are fixed to the front cover through a base plate. Consequently, the weight of the device is relatively high and the number of assembly man-hours is high because of the work required to fix the base plate to the front cover by welding or the like and the work required to fix the return plate to the base plate using rivets, bolts, or other fastening members.

In an elastic coupling mechanism like that just described, since the first rotary member is provided with notches or cut-and-raised parts to support the rotationally facing ends of the coil springs, the shape of the press die used to form the notches or cut-and-raised parts is complex and thus the die cost is relatively high. It is also necessary to increase the rigidity of the rotary member in order prevent the notches or cut-and-raised parts from reducing the rotational strength of the rotary member.

It is also feasible to have a structure in which the second rotary member is arranged on a first rotary member that does not have notches or cut-and-raised parts in such a manner as to form spaces for the springs. The springs are then arranged in the spaces and a separate member is fixed to the first and second rotary members to support the radially inward facing side and the other axially facing side of the springs. However, the problem with this kind of structure is that a new separate member is required to support the radially inward facing side and the other axially facing side of the springs.

In view of the above, there exists a need for a piston coupling mechanism, lockup device for a fluid-type torque transmission device, elastic coupling mechanism, and spring installation method for an elastic coupling mechanism that overcomes the above mentioned problems in the prior art.

This invention addresses this need in the prior art as well as other needs, which will become apparent to those skilled in the art from this disclosure.

SUMMARY OF THE INVENTION

An object of the present invention is to improve the assembly efficiency of the piston coupling mechanism in a lockup device having two friction surfaces.

A second object of the present invention is to simplify the structure of the piston coupling mechanism in a lockup device having two friction surfaces.

A third object of the present invention is to enable the springs to be assembled without increasing the number of parts and without providing notches or cut-and-raised parts in the first rotary member to support the rotationally facing ends of the springs.

A piston coupling mechanism in accordance with a first aspect of the present invention is a piston coupling mechanism that is provided in a lockup device. The lockup device is configured to lock up a fluid-type torque transmission device by using a piston to press a friction coupling part of a clutch mechanism against a front cover. The piston coupling mechanism serves to couple the piston and the front cover together such that the piston and front cover are non-rotatable and axially moveable relative to each other. The piston coupling mechanism is provided with a piston support member and a coupling member. The piston support member is fixed to the front cover and serves to support the piston such that the piston can move in the axial direction. The coupling member is disposed axially between the front cover and the piston. The coupling member is provided with a first fixing part and a second fixing part. The first fixing part is fixed so as to be sandwiched axially between the front cover and the piston support member. The second fixing part is fixed to the piston, and is capable of elastically deforming in the axial direction.

This piston coupling mechanism enables the coupling member to be fixed to the front cover by interposing the first fixing part of the coupling member axially between the front cover and the piston support member. As a result, fewer rivets, bolts, and other fastening members are needed and the number of parts can be decreased relative to the prior art. Thus, the assembly performance of the piston coupling mechanism can be improved.

A piston coupling mechanism in accordance with a second aspect of the present invention is the piston coupling mechanism according to the first aspect, wherein either the front cover or the piston support member has an engaging part that can engage with the first fixed part such that the coupling member cannot rotate relative to the front cover and piston support member.

During the assembly of this piston coupling mechanism, since the first fixing part of the coupling member can engage with an engaging part provided on either the front cover or the piston support member, the coupling member can be attached to either the piston support member or the front cover (whichever is not provided with the engaging part) while in an engaged state with respect to the front cover or the piston support member. As a result, the assembly efficiency of the piston coupling mechanism can be improved.

A piston coupling mechanism in accordance with a third aspect of the present invention is the piston coupling mechanism according to the second aspect, wherein the coupling member is an annular plate configured such that it is capable of elastic deformation in the axial direction and the first and second fixing parts are both plural in number and arranged along a rotational direction.

This piston coupling mechanism enables the number of parts to be reduced relative to the prior art because the coupling member is an annular plate.

A piston coupling mechanism in accordance with a fourth aspect of present invention is the piston coupling mechanism according to the second or third aspect, wherein the engaging part is a protruding part that projects in an axial direction, and either the front cover or the piston support member (whichever does not have the engaging part) has a recessed part into which the tip end of the protruding part can be inserted.

With this piston coupling mechanism, when the piston support member is being fixed to the front cover, the rotational position of the piston support member relative to the front cover can be determined by inserting the tip end of the protruding part into the recessed part. As a result, the work of assembling the piston coupling mechanism can be performed more efficiently.

A piston coupling mechanism according to a fifth aspect of the present invention is the piston coupling mechanism according to any one of the first to fourth aspects, wherein the first fixing part is arranged at a different position in the radial direction than the second fixing part.

With this piston coupling mechanism, since the radial positions of the first fixing part and second fixing part of the coupling member are different, there is less interference between the members than when the radial positions are the same and the axial dimension can be reduced.

A piston coupling mechanism in accordance with a sixth aspect of the present invention is the piston coupling mechanism according to any one of the aforementioned aspects, wherein the piston support member has a limiting part that limits the range of axial movement of the piston.

This piston coupling mechanism enables interference between the piston and other members to be prevented because the axial movement of the piston is limited by a limiting part.

A lockup device in accordance with a seventh aspect of the present invention is a lockup device for a fluid-type torque transmission device that includes a front cover an impeller, and a turbine. The front cover has a friction surface. The impeller is fixed to the front cover and forms a fluid chamber to be filled with an operating fluid. The turbine is arranged within the fluid chamber so as to face the impeller. The lockup device itself is provided with a clutch mechanism, an elastic coupling mechanism, a piston, and a piston coupling mechanism. The clutch mechanism has a friction coupling part that can be pressed against the friction surface. The elastic coupling mechanism elastically couples the clutch mechanism and the turbine together. The piston is disposed between the front cover and the turbine, and is configured such that it can press the friction coupling part against the friction surface. The piston coupling mechanism has an annular coupling member disposed axially between the front cover and the piston, and is configured to couple the piston and the front cover together such that the piston and front cover are non-rotatable and axially movable relative to each other. The coupling member has an annular part and a plurality of elastic parts. The annular part is fixed to either the piston or the front cover. The plurality of elastic parts is formed on either the radially outward facing edge or the radially inward facing edge of the annular part, fixed to either the front cover or the piston (whichever does not have the annular part fixed thereto). Further, the plurality of elastic parts is capable of elastic deformation in the axial direction.

With this lockup device, the torque of the front cover is transmitted to the turbine through the elastic coupling mechanism when the piston moves toward the front cover in the axial direction and presses the friction coupling part of the clutch mechanism against the friction surface of the front cover. When this occurs, the elastic parts of the coupling member that forms the piston coupling mechanism deform in the axial direction as the piston and front cover become closer together in the axial direction. The coupling member facilitates the transmission of torque between the front cover and the piston.

Thus, using only an annular coupling member, this piston coupling mechanism enables the piston to move in the axial direction and torque to be transmitted between the front cover and the piston. Unlike a conventional piston coupling mechanism, it is not necessary to construct the coupling member out of a plurality of flat springs, and it is not necessary to provide a base plate to fix the flat springs to the front cover. As a result, the structure of the piston coupling mechanism can be simplified.

A lockup device in accordance with an eighth aspect of the present invention is the lockup device according to the seventh aspect, wherein each of the elastic parts has a first portion that extends away from a radially facing edge of the annular part in a direction of separation from the annular part. The second portion extends to one side in a rotational direction from the end part of the first portion that is farther from the annular part.

A lockup device in accordance with a ninth aspect of the present invention is the lockup device according to the seventh or eighth aspect, wherein a piston support member that supports the piston such that the piston can move in the axial direction is provided on the turbine side of the front cover. Further, the annular part is fixed so as to be sandwiched axially between the front cover and the piston support member.

With this lockup device, since the annular part of the coupling member is fixed by being sandwiched axially between the front cover and the piston support member and is not fixed with rivets, bolts, or other fastening members, the number of parts can be reduced and the structure of the piston coupling mechanism can be simplified.

The elastic coupling mechanism in accordance with a tenth aspect of the present invention is configured to transmit torque and also to absorb and damp torsional vibrations. The coupling mechanism is provided with a plurality of springs, a first rotary member, a second rotary member, and a third rotary member. The springs are arranged along a rotational direction and can deform elastically in the rotational direction. The first rotary member is configured to support the springs such that the springs can move in the rotational direction. The first rotary member has a first axial support part configured to support one axially facing side of the springs, and a first radially outside support part configured to support the radially outward facing side of the springs. The second rotary member is fixed to the first rotary member and has a plurality of second rotational direction support parts that are disposed rotationally between the springs and support the rotationally facing ends of the springs. The third rotary member is provided such that it can rotate relative to the first and second rotary members, and has a plurality of third rotational direction support parts that support the rotationally facing ends of the springs. The first and second rotary members are configured such that, when fixed together, they support the radially inward facing side of the springs and the other axially facing side of the springs. The first axial support part has a plurality of positioning holes that are formed in rotational positions corresponding to the second rotational direction support parts and have rotational direction lengths that are larger than the rotational direction widths of the second rotational direction support parts.

With this elastic coupling mechanism, the springs can be installed, for example, as follows because a plurality of position holes are formed in the first axial support part of the first rotary member. First a tool having a plurality of protruding parts that can be inserted into the positioning holes of the first rotary member is prepared and the protruding parts of the tool are inserted into the positioning holes. As a result, spaces for arranging the springs are formed rotationally between the protruding parts, i.e., rotationally between the positioning holes. After the springs have been arranged rotationally between the positioning holes, the protruding parts of the tool are removed from the positioning holes and the second rotational direction support parts of the second rotary member are arranged so as to be aligned with the rotational direction positions of the positioning holes. Since the rotation direction length of each positioning hole is larger than the rotational direction width of each second rotational direction support part, the work of arranging the second rotational direction support parts at the rotational direction positions of the positioning holes can be conducted smoothly. Finally, the second rotary member is fixed to the first rotary member. When fixed together, the first and second rotary members can support the radially inward facing side of the springs and the other axially facing side of the springs. Thus, the radially inward and the radially outward facing sides of the springs as well as the axially facing sides of the springs are supported by the first and second rotary members.

Since the springs can be assembled using the positioning holes of the first rotary member, the springs can be assembled without increasing the number of component parts of the elastic coupling mechanism and without providing notches or cut-and-raised parts on the first rotary member for supporting the rotationally facing ends of the springs.

A spring installation method in accordance with an eleventh aspect of the present invention is a method of installing a plurality of springs into prescribed positions in an elastic coupling mechanism configured both to transmit torque and to absorb and damp torsional vibrations through a plurality of springs arranged along a rotational direction. The spring installation method includes a rotary member preparation step, a hole forming step, a tool preparation step, a tool inserting step, a spring arranging step, a spring supporting step, and a fixing step. In the rotary member preparation step, a plurality of rotary members is prepared. The plurality of rotary members includes a first rotary member that is configured to support the springs such that the springs can move in the rotational direction. The plurality of rotary members has a first axial support part configured to support one axially facing side of the springs and a first radially outside support part configured to support the radially outward facing side of the springs. The plurality of rotary members also includes a second rotary member that is fixed to the first rotary member and has a plurality of second rotational direction support parts. The second rotational direction support parts are disposed rotationally between the springs and support the rotationally facing ends of the springs. In the hole forming step, a plurality of positioning holes whose rotational direction lengths are larger than the rotational direction widths of the second rotational direction support parts is formed in the first axial support part at rotational positions corresponding to the second rotational direction support parts. In the tool preparation step, a spring installation tool having a plurality of protruding parts that can be inserted into the positioning holes is prepared. In the tool inserting step, which is performed after the hole forming step and the tool preparation step, the protruding parts are inserted into the positioning holes. In the spring arranging step, which is performed after the tool inserting step has been completed and the protruding parts have been inserted into the positioning holes, the springs are arranged rotationally between the positioning holes of the first rotary member. In the spring supporting step, which is performed after the spring arranging step, the protruding parts are removed from the positioning holes of the first rotary member and the second rotational direction support parts of the second rotary member are arranged so as to correspond to the rotational positions of the positioning holes. In the fixing step, which is performed after the spring supporting step, the first rotary member and the second rotary member are fixed together.

With this spring installation method, a plurality of positioning holes is formed in a first rotary member. The first rotary member serves to support the springs of the elastic coupling mechanism such that the springs can move in the rotational direction and the springs can be installed in the first rotary member using a spring installation tool. The spring installation tool has a plurality of protruding parts that can be inserted into the positioning holes. As a result, the springs can be installed without increasing the number of component parts of the elastic coupling mechanism and without providing notches or cut-and-raised parts on the first rotary member for supporting the rotationally facing ends of the springs.

A lockup device according to a twelfth aspect of the present invention is a lockup device for a fluid-type torque transmission device that includes a front cover, an impeller, and a turbine. The front cover has a friction surface. The impeller is fixed to the front cover and forms a fluid chamber to be filled with an operating fluid. The turbine is arranged within the fluid chamber so as to face the impeller. The lockup device is provided with a plurality of springs, a first rotary member, a second rotary member, a third rotary member, and a piston. The springs are arranged along a rotational direction between the piston and the turbine such that the springs can deform elastically in the rotational direction. The first rotary member is disposed on the turbine side of the springs. The first rotary member is configured to support the springs such that the springs can move in the rotational direction. The first rotary member has a first axial support part that supports the turbine side of the springs, and a first radially outside support part that supports the radially outward facing side of the springs. The second rotary member is fixed to the first rotary member and the turbine. The second rotary member has a plurality of second rotational direction support parts that are disposed rotationally between the springs and support the rotationally facing ends of the springs. The third rotary member is provided such that it can rotate relative to the first and second rotary members. The third rotary member has a friction coupling part that faces the friction surface and a plurality of third rotational direction support parts that support the rotationally facing ends of the springs. The piston is disposed on the turbine side of the friction coupling part, and coupled to the front cover such that it is non-rotatable and axially movable relative to the front cover. The piston is configured such that it can press the friction coupling part against the friction surface. The first and second rotary members are configured such that, when fixed together, they support the radially inward facing side of the springs and the front cover side of the springs. The first axial support part has a plurality of positioning holes that are formed in rotational positions corresponding to the second rotational direction support parts and have rotational direction lengths that are larger than the rotational direction widths of the second rotational direction support parts.

With this lockup device, the springs can be installed, for example, as follows because a plurality of position holes are formed in the first axial support part of the first rotary member. First a tool having a plurality of protruding parts that can be inserted into the positioning holes of the first rotary member is prepared and the protruding parts of the tool are inserted into the positioning holes. As a result, spaces for arranging the springs are formed rotationally between the protruding parts, i.e., rotationally between the positioning holes. After the springs have been arranged rotationally between the positioning holes, the protruding parts of the tool are removed from the positioning holes and the second rotational direction support parts of the second rotary member are arranged so as to be aligned with the rotational direction positions of the positioning holes. Since the rotation direction length of each positioning hole is larger than the rotational direction width of each second rotational direction support part, the work of arranging the second rotational direction support parts at the rotational direction positions of the positioning holes can be conducted smoothly. Finally, the second rotary member is fixed to the first rotary member. When fixed together, the first and second rotary members can support the radially inward facing side of the springs and the other axially facing side of the springs. Thus, the radially inward and the radially outward facing sides of the springs as well as the axially facing sides of the springs are supported by the first and second rotary members.

Since the springs can be assembled using the positioning holes of the first rotary member, the springs can be assembled without increasing the number of parts composing the elastic coupling mechanism of the lockup device and without providing notches or cut-and-raised parts on the first rotary member to supporting the rotationally facing ends of the springs.

Furthermore, since the positioning holes serve as a flow path for the operating fluid between the turbine and the turbine side of the piston, the amount of operating fluid that flows from the turbine to the turbine side of the piston when the lockup device enters the locked up state increases and the lockup response, i.e., the response with which the piston presses the friction coupling part against the friction surface, can be improved.

A lockup device in accordance with a thirteenth aspect of the present invention is the lockup device according to the twelfth aspect, wherein the third rotational direction support parts extend toward the turbine from a radially outward facing edge of the friction coupling part, and the positioning holes are arranged such that at least a portion thereof is positioned more radially inward than the radial position of the third rotational direction support parts.

With this lockup device, the operating fluid flows more readily toward the turbine side of the piston because at least a portion of the positioning holes is positioned more radially inward than the radial position of the third rotational direction support parts. Consequently, the amount of operating fluid that flows from the turbine toward the turbine side of the piston can be increased further.

A lockup according to a fourteenth aspect of the present invention is the lockup device according to the twelfth or thirteenth aspect, wherein the first rotary member has a communication hole formed in a position more radially inward than the radial position of the third rotational direction support parts.

With this lockup device, since a communication hole is provided in the first rotary member, the amount of operating fluid that flows from the turbine toward the turbine side of the piston when the lockup device enters the locked up state increases and the lockup response, i.e., the response with which the piston presses the friction coupling part against the friction surface, can be improved.

A lockup device according to a fifteenth aspect is the lockup device according to any one of the twelfth to fourteenth aspects, wherein the third rotational direction support parts engage with the second rotary member in such a manner that they cannot move in the radial direction.

With this lockup device, the radial position of the third rotary member is stable because the third rotational direction support parts engage with the second rotary member in such a manner that they cannot move in the radial direction.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

A first embodiment of the present invention will now be described based on the drawings.

(1) Overall Structure of the Torque Converter

Figure 1:
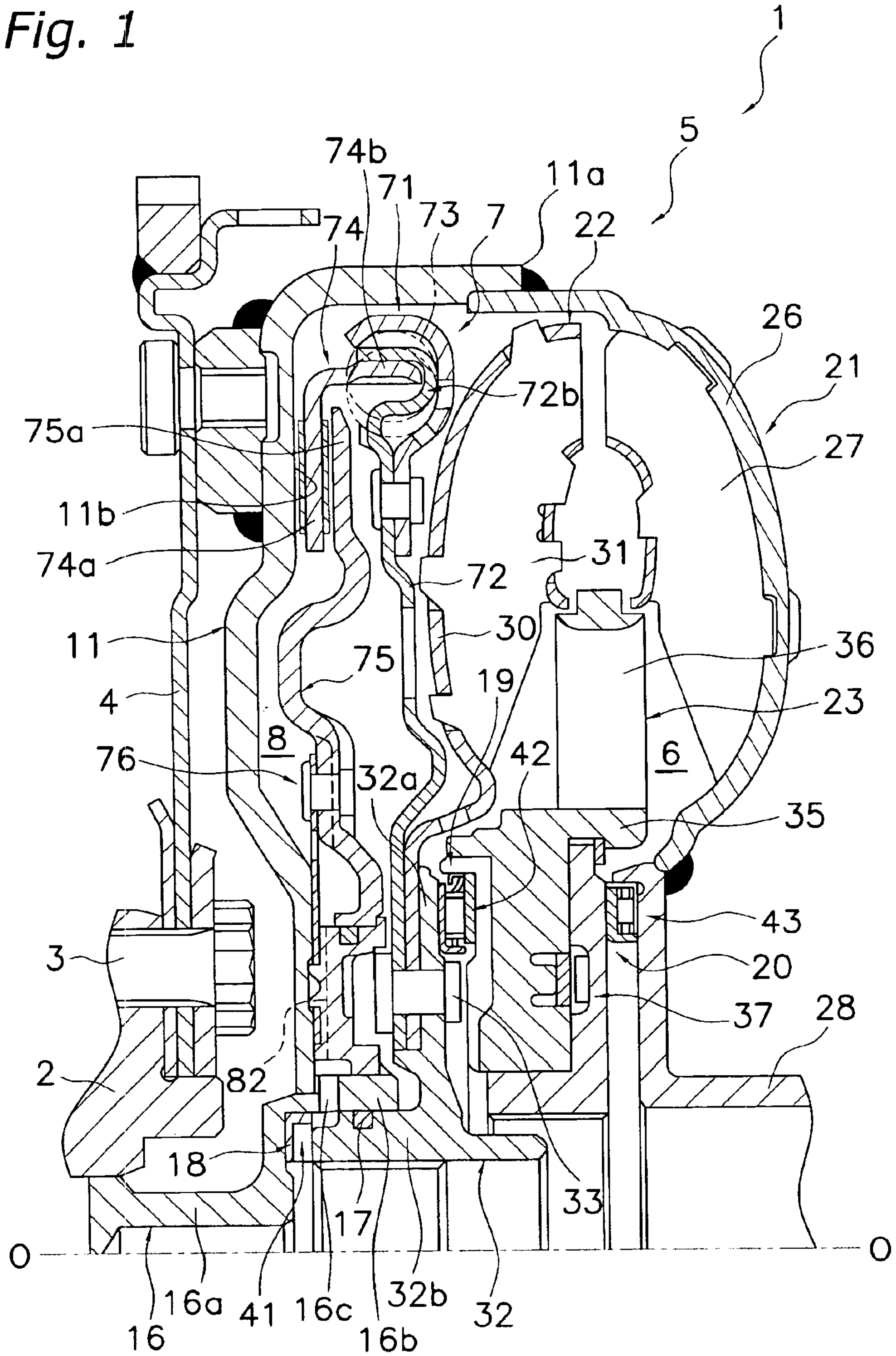
FIG. 1 is a vertical cross-sectional schematic view of a torque converter in accordance with a first preferred embodiment of the present invention.

FIG. 1 is a vertical cross-sectional schematic view of a torque converter 1 in which a piston coupling mechanism, a fluid-type torque transmission device lockup device, an elastic coupling mechanism, and an elastic coupling mechanism spring installation method in accordance with a first preferred embodiment of the present invention have been used. The torque converter 1 serves to transmit torque from the crankshaft 2 of an engine to the input shaft (not shown) of a transmission. The engine (not shown) is arranged on the left side of FIG. 1 and the transmission (not shown) is arranged on the right side of FIG. 1. The line O—O shown in FIG. 1 is the rotational axis of the torque converter 1.

The torque converter 1 chiefly has a flexible plate 4 and a torque converter main body 5. The flexible plate 4 has a thin circular disc-shaped member and serves to transmit torque and to absorb bending vibrations transmitted to the torque converter main body 5 from the crankshaft 2. The flexible plate 4 has sufficient rigidity in the rotational direction to transmit torque but its rigidity is low in the bending or axial direction. An inner circumferential part of the flexible plate 4 is fixed to the crankshaft 2 with a crank bolt 3. Consequently, the axial space of the inner circumferential part of the torque converter main body 5 is small.

The torque converter main body 5 is provided with a front cover 11 fixed to an outer circumferential part of the flexible plate 4, three types of bladed wheels (impeller 21, turbine 22, and stator 23), and a lockup device 7. The fluid chamber is defined by the front cover 11 and the impeller 21 and is filled with operating oil. The fluid chamber is divided into a torus-shaped fluid operating chamber 6 defined by the impeller 21, the turbine 22, and the stator 23 and an annular space 8 in which the lockup device 7 is arranged.

The front cover 11 is a circular disc-shaped member having a generally cylindrical center boss 16 that extends in the axial direction fixed by welding or the like to an inner circumferential part thereof. The center boss 16 has a crankshaft side cylindrical part 16*a* that fits inside a center hole of the crankshaft 2 and a turbine side cylindrical part 16*b* that extends toward the turbine.

An outer cylindrical part 11*a* that extends toward the transmission is formed on an outer cylindrical part of the front cover 11. The outer circumferential edge of the impeller shell 26 of the impeller 21 is fixed by welding or the like to the tip end of this outer cylindrical part 11*a*. The front cover 11 and the impeller 21 form a fluid chamber that is filled with operating oil.

The impeller 21 chiefly has the impeller shell 26, a plurality of impeller blades 27 fixed to the inside of the impeller shell 26, and an impeller hub 28 fixed by welding or the like to an inner circumferential part of the impeller shell 26.

The turbine shell 22 is disposed inside the fluid chamber and arranged such that it faces axially toward the impeller 21. The turbine 22 chiefly has a turbine shell 30, a plurality of turbine blades 31, and a turbine hub 32. The plurality of turbine blades 31 is fixed to the surface of the turbine shell 30 faces to the impeller 21. The turbine hub 32 is fixed to the inner circumferential edge of the turbine shell 30. The turbine hub 32 has a flange part 32*a* and a boss part 32*b*. The turbine shell 30, together with a driven plate 72, which is discussed later, is fixed to the flange part 32*a* of the turbine hub 32 with a plurality of rivets 33. Splines that engage with the input shaft (not shown) are formed on the inside circumferential surface of the boss part 32*b* of the turbine hub 32. As a result, the turbine hub 32 rotates integrally with the input shaft (not shown). The outside circumferential surface of the boss part 32*b* on the side thereof that is closer to the front cover 11 can slide with respect to the inside circumferential surface of the turbine side cylindrical part 16*b* of the center boss 16 through a seal ring 17.

The stator 23 is a mechanism serving to direct the flow of the operating oil returning to the impeller 21 from the turbine 22 and is disposed axially between an inner circumferential part of the impeller 21 and an inner circumferential part of the turbine 22. The stator 23 is fabricated as a single integral unit by cast molding a resin, an aluminum alloy, or the like. The stator 23 chiefly has an annular stator carrier 35 and a plurality of stator blades 36 provided on the outside circumferential surface of the stator carrier 35. The stator carrier 35 is supported by a cylindrical stationary shaft (not shown) through a one-way clutch 37.

An oil passage 16*c* that enables the operating oil to communicate in the radial direction is formed in the turbine side cylindrical part 16*b* of the center boss 16. A first thrust bearing 41 is arranged axially between the center boss 16 and the turbine hub 32. The first thrust bearing 41 serves to bear the thrust force generated by the rotation of the turbine 22. A first port 18 enables operating oil to communicate both radially inwardly and radially outwardly. The first port 18 is formed in the portion where the first thrust bearing 41 is arranged. The oil passage 16*c* is arranged so as to communicate with the radially outside part of the first port 18. A second thrust bearing 42 is arranged between the turbine hub 32 and an inner circumferential part of the stator 23 (more specifically, the one-way clutch 37). A second port 19 enables operating oil to communicate both radially inwardly and radially outwardly. The second port 19 is formed in the portion where the second thrust bearing 42 is arranged. A third thrust bearing 43 is arranged axially between the stator 23 (more specifically the stator carrier 35) and the impeller 21 (more specifically, the impeller hub 28). A third port 20 that enables operating oil to communicate both radially inwardly and radially outwardly is formed in the portion where the third thrust bearing 43 is arranged. The ports 18 to 20 are connected to a hydraulic circuit (not shown) and operating oil can be delivered to and discharged from each port independently.

(2) Structure of the Lockup Device

The lockup device 7 is a mechanism serving to couple mechanically the turbine 22 and the front cover 11 together when necessary and is axially arranged in the space 8 between these two components 11 and 22.

Figure 2:
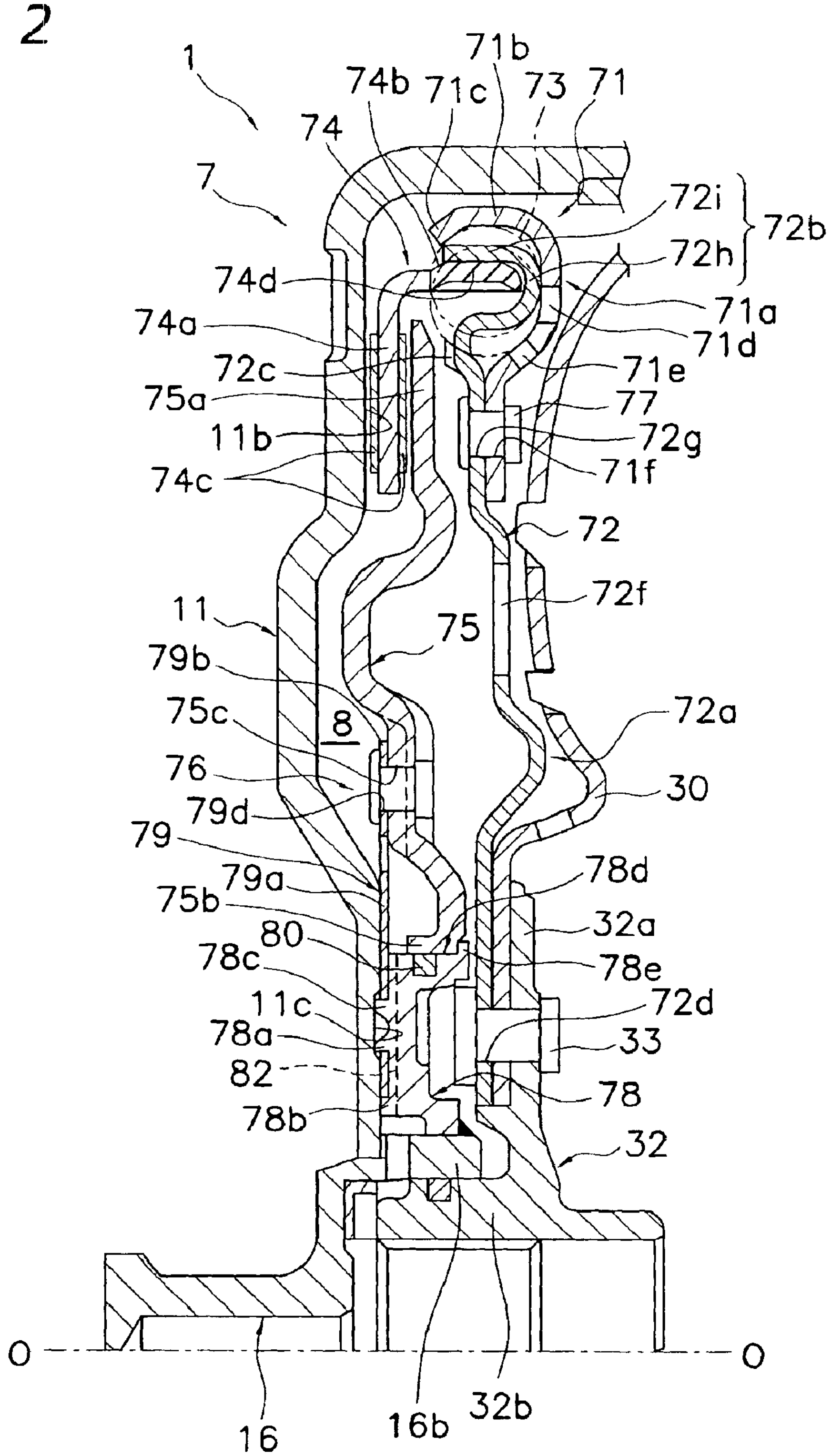
FIG. 2 is an enlarged partial view of FIG. 1 showing a lockup device of the torque converter of FIG. 1.
Figure 3:
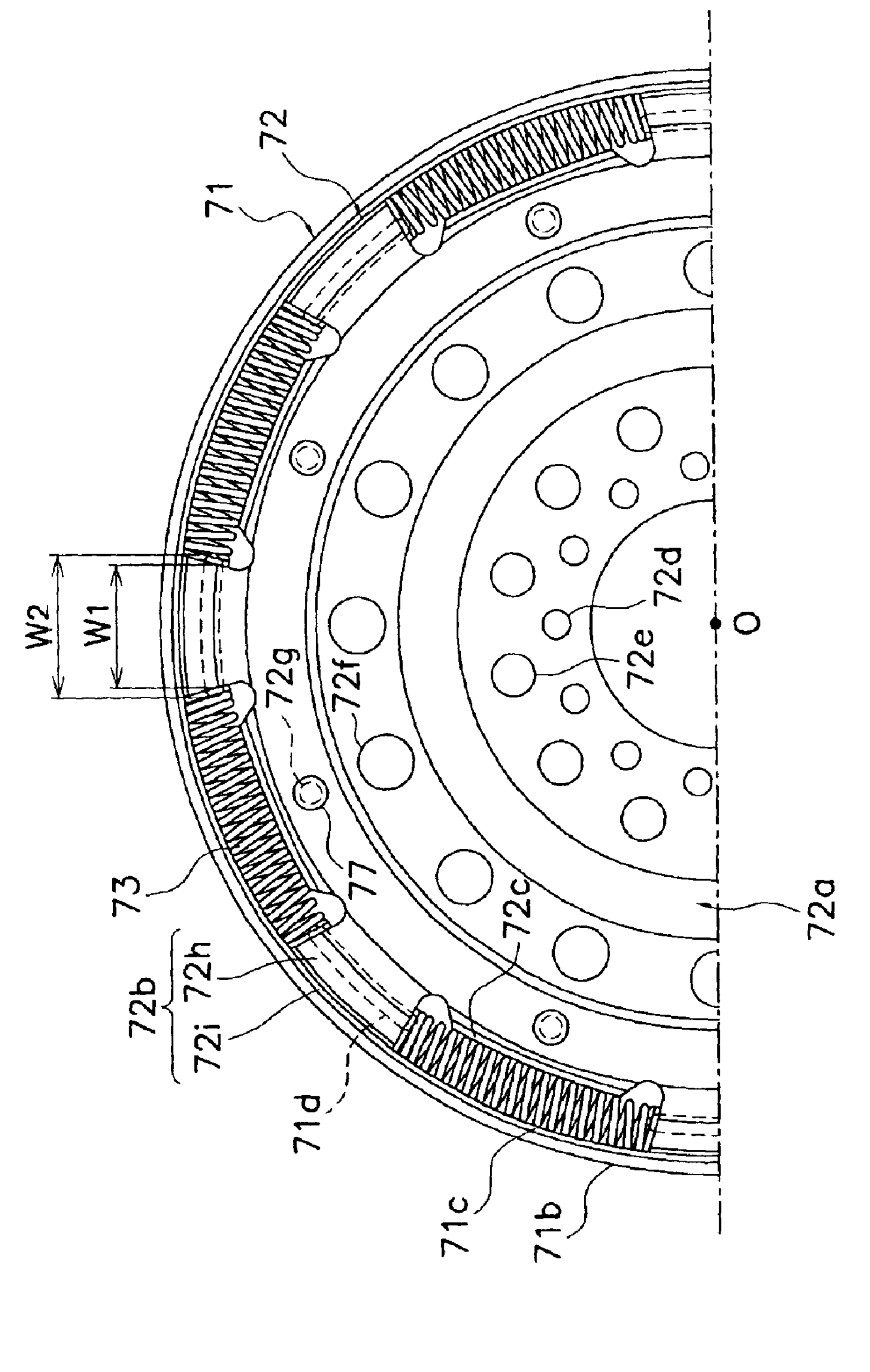
FIG. 3 is a partial elevational view from a front cover side of the torque converter illustrating an assembly of a spring holder, a driven plate, and a torsion springs of the lockup device.
Figure 4:
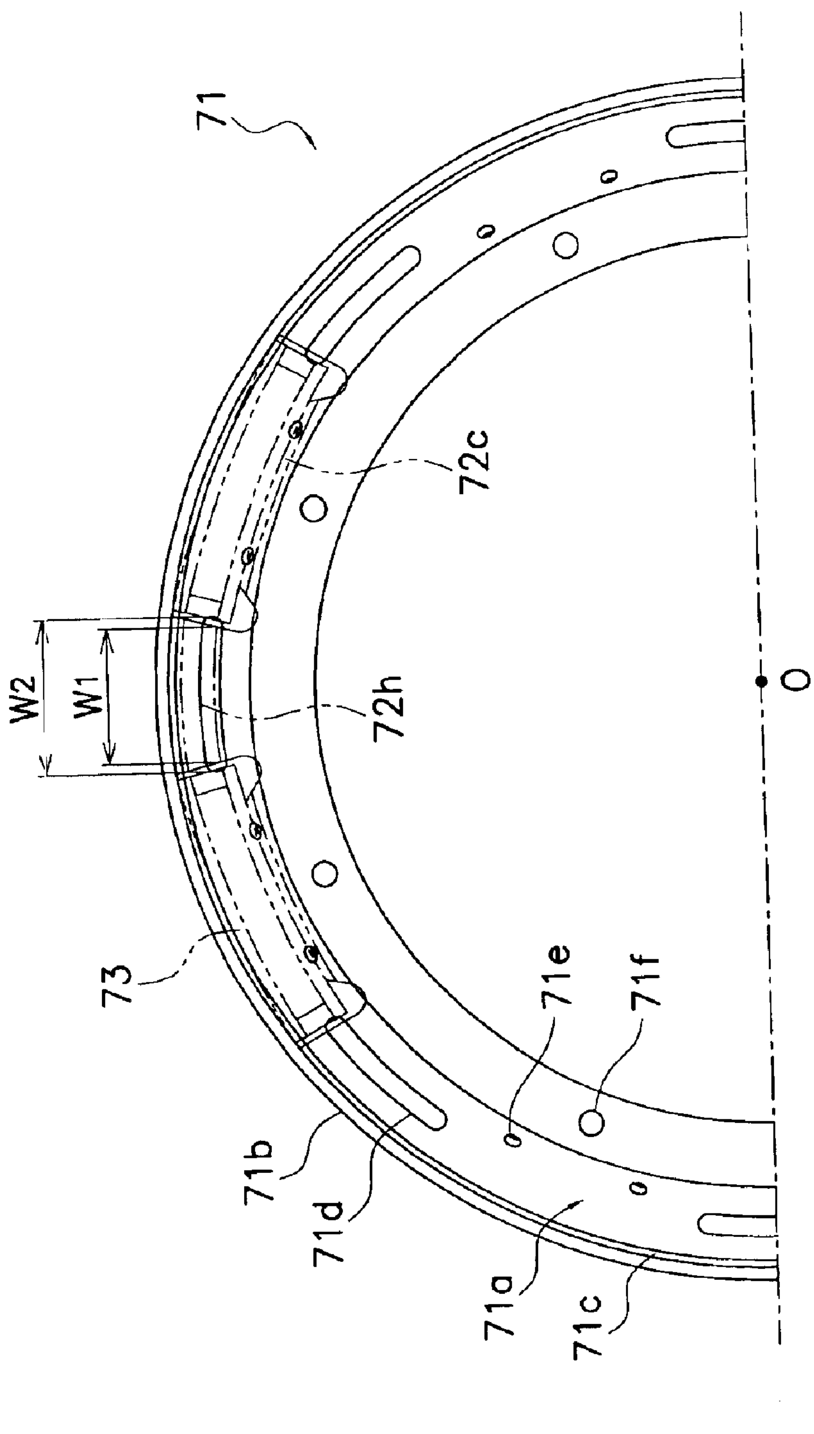
FIG. 4 is a partial elevational view showing the spring holder as viewed from the front cover side.
Figure 5:
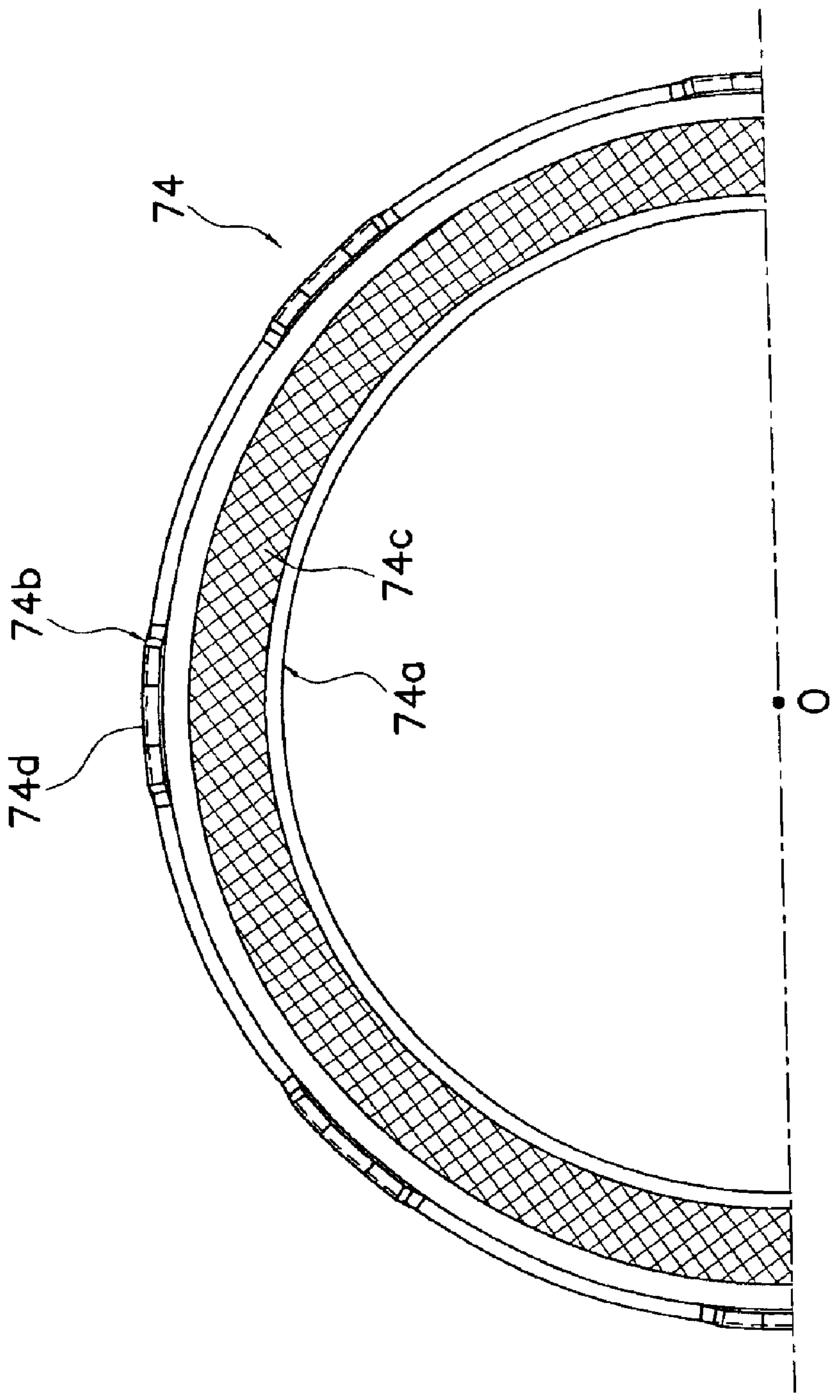
FIG. 5 is a partial elevational view showing a drive plate as viewed from a turbine side of the torque converter.
Figure 6:
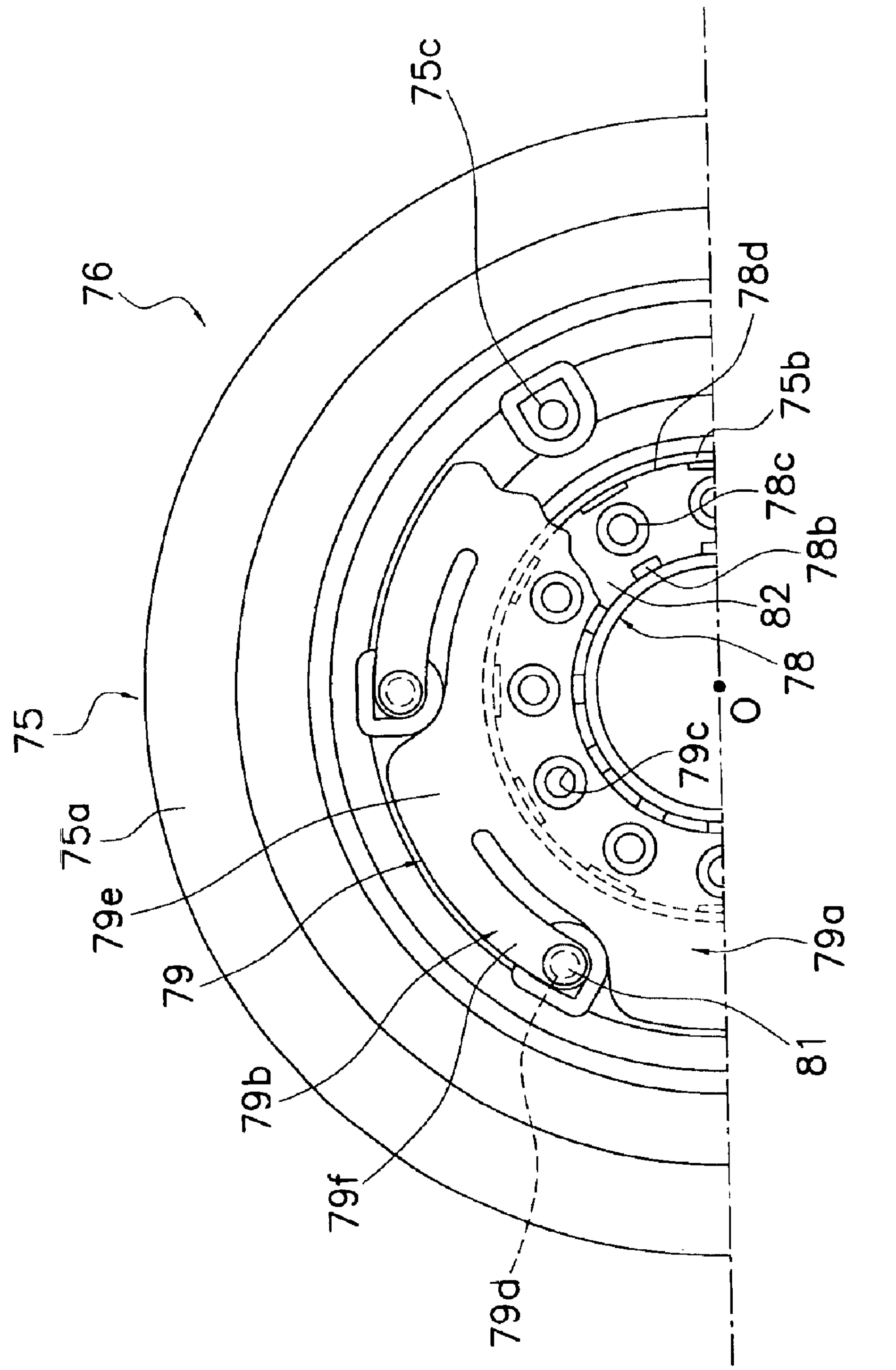
FIG. 6 is a partial elevational view showing a piston and a piston coupling mechanism of lockup device in accordance with the first preferred embodiment as viewed from the front cover side with portions removed for illustrative purposes.

The lockup device 7 functions as both a clutch mechanism and as an elastic coupling mechanism, and chiefly has a spring holder 71, a driven plate 72, a torsion spring 73, a drive plate 74, a piston 75, and a piston coupling mechanism 76. FIG. 2 is a partial enlarged view of FIG. 1 showing the lockup device 7. FIG. 3 is a view from the front cover side illustrating the assembly of the spring holder 71, the driven plate 72, and the torsion spring 73. FIG. 4 shows the spring holder 71 as viewed from the front cover side. FIG. 5 shows the drive plate 74 as viewed from the turbine side. FIG. 6 shows the piston 75 and the piston coupling mechanism 76 as viewed from the front cover side.

1. Spring Holder

As seen in FIGS. 2 and 4, the spring holder 71 is an annular plate member and has an annular part 71*a*, a cylindrical part 71*b*, and a tapered cylindrical part 71*c*. The cylindrical part 71*b* extends toward the front cover 11 from an outer circumferential end part of the annular part 71*a*. The tapered cylindrical part 71*c* that decreases in diameter as it extends toward the front cover 11 from the end of the cylindrical part 71*b* that is closer to the front cover 11.

The annular part 71*a* has a plurality (eight in this embodiment) of slit holes 71*d* formed along a rotational direction, a plurality (sixteen in this embodiment, two each in positions corresponding to the areas existing rotationally between the slit holes 71*d*) of oil holes 71*e* formed in positions more radially inward than the slit holes 71*d*, and a plurality (eight in this embodiment one each in positions corresponding to the areas existing rotationally between the slit holes 71*d*) of fixing holes 71*f* formed in positions more radially inward than the oil holes 71*e*.

2. Torsion Spring

Referring now to FIGS. 2 and 3, the torsion spring 73 is made of a plurality (eight in this embodiment) of coil springs arranged so as to be aligned with the spaces rotationally between the slit holes 71*d* of the spring holder 71. The turbine side of the torsion spring 73 is supported by the annular part 71*a* of the spring holder 71 and the radially outward facing side is supported by the cylindrical part 71*b*.

3. Driven Plate

The driven plate 72 is an annular plate member that serves in conjunction with the spring holder 71 to support the plurality of torsion springs 73. An inner circumferential part thereof is fixed to the flange part 32*a* of the turbine hub 32 along with the turbine shell 30 such that the driven plate rotates integrally with the turbine 22.

The driven plate 72 has a first annular part 72*a*, a plurality of first claw parts 72*b*, and a plurality of second claw parts 72*c*. The plurality (eight in this embodiment) of first claw parts 72*b* is disposed circumferentially around the outside circumferential edge of the first annular part 72*a*. The plurality (eight in this embodiment) of second claw parts 72*c* is disposed rotationally between the first claw parts 71*b*.

The first annular part 72*a* has a plurality of first fixing holes 72*d*, and plurality of first oil holes 72*e*, a plurality of second oil holes 72*f*, and a plurality of second fixing holes 72*g*. The plurality (twelve in this embodiment) of first fixing holes 72*d* is formed in a radially innermost portion and arranged along a rotational direction. The plurality (in this embodiment, twelve arranged in positions corresponding to the areas existing rotationally between the first fixing holes 72*d*) of first oil holes 72*e* is formed to the radial outside of the first fixing holes 72*d*. The plurality (sixteen in this embodiment) of second oil holes 72*f* is formed to the radial outside of the first oil holes 72*e*. The plurality (in this embodiment, eight arranged in positions corresponding to the areas existing rotationally between the second claw parts 72*c*) of second fixing holes 72*g* is formed to the radial outside of the second oil holes 72*f*.

The first fixing holes 72*d* are holes through which rivets 33 are passed when the driven plate 72 is fixed to the flange part 32*a* of the turbine hub 32 together with the turbine shell 30. The second fixing holes 72*g* are formed so as to align with the fixing holes 71*f* of the spring holder 71 and rivets 77 are passed therethrough when the driven plate 72 is fixed to the spring holder 71.

The first claw parts 72*b* are arranged in the space formed by the annular part 71*a* and cylindrical part 71*b* of the spring holder 71. Both rotationally facing ends of each torsion spring 73 are supported by the rotationally facing ends of the first claw parts 72*b* either directly or through a spring seat. More specifically, each first claw part 72*b* has a second annular part 72*h* that extends radially outward along the surface of the annular part 71*a* of the spring holder 71 that faces front cover and a cylindrical part 72*i* that that extends toward the front cover from the radially outside end part of the second annular part 72*h*.

When viewed from the front cover side, the second annular parts 72*h* are provided such that at least a portion of each overlaps a slit hole 71*d* formed in the annular part 71*a* of the spring holder 71. Moreover, the rotational direction width W1 of the portion of each second annular part 72*h* that overlaps the corresponding slit hole 71*d* is smaller than the rotational direction width W2 of the slit hole 71*d*.

The outside diameter of the cylindrical parts 72*i* is smaller than the inside diameter of the front cover side of the tapered cylindrical parts 71*c* of the spring holder 71. Thus, the driven plate 72 is configured such that it can be attached to the spring holder from the front cover side.

The second claw parts 72*c* are portions formed by cutting and raising the outside edge part of the first annular part 72*a* toward the front cover. When the driven plate 72 is attached to the spring holder 71, the torsion springs 73 are supported at the radially inward facing side and the front cover side thereof by the second claw parts 72*c* and the tapered cylindrical part 71*c* of the spring holder 71.

In this way, the torsion springs 73 are supported by the spring holder 71 and the driven plate 72.

4. Drive Plate

Referring to FIGS. 2 and 5, the drive plate 74 is arranged on the front cover side of the driven plate 72 and is configured such that it can rotate relative to the driven plate 72. The drive plate 74 also functions as a clutch mechanism that can be coupled with and disengaged from the front cover 11.

The drive plate 74 is an annular plate member arranged on the front cover side of the driven plate 72. The drive plate 74 has an annular friction coupling part 74*a* that is closely adjacent to the friction surface 11*b* of the front cover 11, and a plurality of claw parts 74*b* that extends toward the turbine from the radially outward edge part of the friction coupling part 74*a* and abuts against the rotationally facing ends of the torsion springs 73.

Friction facings 74*c* are attached to both surfaces of the friction coupling part 74*a*. The claw parts 74*b* are arranged in the same rotational positions as the first claw parts 72*b* of the driven plate 72 and are configured such that they can compress the torsion springs 73 in the rotational direction with respect to the first claw parts 72*b* of the driven plate 72. At least a portion of the turbine-facing end part of each claw part 74*b* is positioned more radially outward than the rotational position of the slit holes 71*d* of the spring holder 71. Each claw part 74*b* has a protruding part 74*d*, a portion of which bulges radially outward. The protruding parts 74*d* fit inside the cylindrical parts 72*i* of first claw parts 72*b* of the driven plate 72. Thus, the drive plate 74 is supported by the driven plate 72 in such a manner that it can move in the axial direction but cannot move in the radial direction.

In this way, the spring holder 71, the driven plate 72, the torsion springs 73, and the claw parts 74*b* of the drive plate 74 form the elastic coupling mechanism of the lockup device 7.

5. Piston

Referring now to FIGS. 2 and 6, the piston 75 is a circular disc-shaped member having a center hole. The piston 75 is arranged around the outside of a piston pilot 78 (discussed later). The outer circumferential part of the piston 75 forms a pressing part 75*a*. The pressing part 75*a* is an annular portion having a flat surface on the side that faces the front cover 11 and is arranged on the turbine side of the friction coupling part 74*a* of the drive plate 74. Consequently, when the piston 75 moves toward the front cover 11, the pressing part 75*a* presses the friction coupling part 74*a* against the friction surface 11*b* of the front cover 11. A cylindrical part 75*b* that extends toward the front cover is formed on the inside circumferential part of the piston 75. A plurality (six in this embodiment) of fixing holes 75*c* are formed in a radially intermediate section of the piston 75.

6. Piston Coupling Mechanism

The piston coupling mechanism 76 functions to couple the piston 75 to the front cover 11 in such a manner that the piston 75 can rotate integrally with the front cover 11 while also being able to move axially with respect to the front cover 11 within a prescribed range. The piston coupling mechanism 76 is provided in a region ranging from the proximity of the fixing holes 75*c* of the piston 75 to a point radially inward of the fixing holes, and has a piston pilot 78 and a return plate 79.

The piston pilot 78 is an annular member fixed by welding or the like to the outside circumferential surface of the turbine-side cylindrical part 16*b* of the center boss 16. The piston pilot 78 has an annular main body part 78*a*, a plurality of first protruding parts 78*b*, a plurality of second protruding parts 78*c*, and a piston support part 78*d*. The plurality (twelve in this embodiment) of first protruding parts 78*b* abuts against the turbine side surface of the front cover 11. The plurality (twelve in this embodiment) of second protruding parts 78*c* is provided to the radial outside of the first protruding parts 78*b*. The piston support part 78*d* is formed on the outside circumferential part of the main body part 78*a* and serves to support the cylindrical part 75*b* of the piston 75. Recessed parts 11*c* into which the second protruding parts 78c can be inserted are formed in the turbine side surface of the front cover 11 at positions corresponding to the second protruding parts 78c.

Additionally, a seal ring 80 is provided on the portion of the piston support part 78d that supports the cylindrical part 75b of the piston 75. The seal ring 80 functions to prevent the operating oil from flowing between the front cover side and the turbine side of the piston 75 within the space 8.

A limiting part 78e that serves to limit the movement of the piston 75 toward the turbine is formed on the piston support part 78d. In this embodiment, the limiting part 78e is an annular protruding part provided on the turbine side end part of the piston support part 78d. As a result, the piston 75 is supported by the piston pilot 78 such that it can move within a prescribed range in the axial direction, and thus, does not easily interfere with the other members.

The return plate 79 is an annular plate member having an annular part 79a and a plurality of arm parts 79b formed on the outside circumference of the annular part 79a.

First fixing holes 79c into which the second protruding parts 78c of the piston pilot 78 can fit are formed in an inner circumferential part of the annular part 79a. In this embodiment, the first fixing holes 79c are made slightly smaller than the diameter of the second protruding parts 78c so that the second protruding parts 78c are press-fitted therein.

The arm parts 79b are arranged along a rotational direction and each has a first portion 79e that extends radially outward from the outside circumferential edge of the annular part 79a, and a second portion 79f that extends in a rotational direction from the outside end part of the first portion 79e. Second fixing holes 79d corresponding to the fixing holes 75c of the piston 75 are formed in the rotationally-facing end parts of the second portions 79f of the arm parts 79b.

The return plate 79 is fixed at its outer circumferential part to the piston 75 and its inner circumferential part is fixed so as to be sandwiched axially between the front cover 11 and the piston pilot 78. The arm parts 79b can deform elastically in the axial direction. Since rivets, bolts, and other fastening members are not needed to fix the return plate 79 to the front cover 11, the number of parts is reduced and assembly is simplified.

Since the return plate 79 has a plurality of arm parts 79b that can deform elastically in the axial direction and constitutes a single plate member that can transfer torque between the piston 75 and the front cover 11, the number of parts is fewer and the axial dimension is shorter than conventional structures in which a plurality of flat springs are fixed to a front cover through a base plate.

Since the radial position at which the return plate 79 is fixed to the piston is different from the radial position at which it is fixed to the front cover, there is less interference between the members and the axial dimension can be made smaller.

When the return plate 79 is sandwiched axially between the piston pilot 78 and the front cover 11, the first protruding parts 78b about against the front cover 11 such that a space is formed between the turbine-side surface of the return plate 79 and the front-cover-side surface of the main body part 78a of the piston pilot 78. Thus, radially extending oil passages 82 are formed axially between the piston pilot 78 and the front cover 11 and the oil passage 16c of the center boss 16 can communicate with a region of the space 8 that lies axially between the front cover 11 and the piston 75. As a result, operating oil can be supplied to and discharged from the space 8 through the oil passage 16c, the oil passages 82, and the first port 18.

When the piston 75 moves toward the front cover 11, the return plate 79 can apply a force on the piston 75 toward the turbine by means of the arm parts 79b deforming elastically. When the piston 75 presses the friction coupling part 74a of the drive plate 74 against the friction surface 11b of the front cover 11, the return plate 79 can transmit torque between the piston 75 and the front cover 11.

(3) Operation of the Torque Converter

Figure 7:
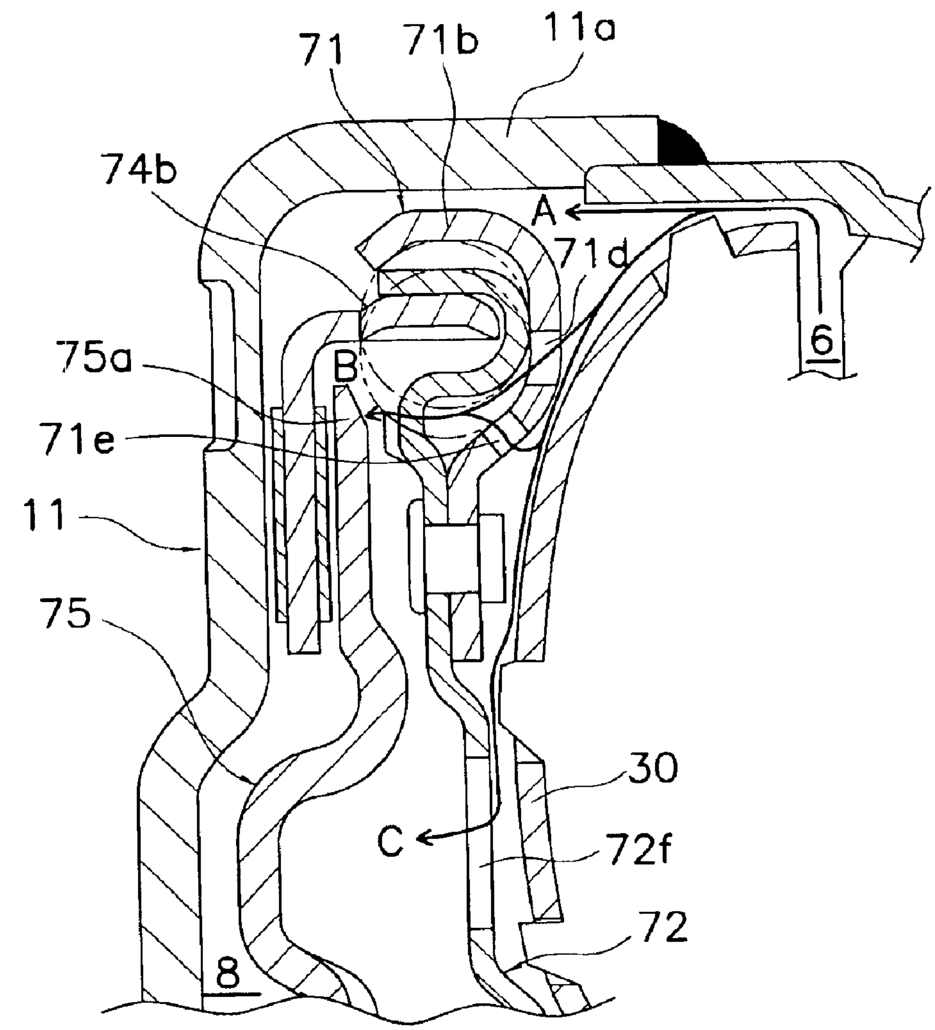
FIG. 7 is an enlarged partial view of FIG. 1 showing how the operating oil flows in the vicinity of the spring holder when the torque converter is approaching the locked up state.

The operation of the torque converter 1 will now be described using FIGS. 1, 2, and 7. FIG. 7 is an enlarged partial view of FIG. 1 showing how the operating oil flows in the vicinity of the spring holder 71 when the torque converter is approaching the locked up state.

Immediately after the engine is started, operating oil is supplied to the inside of the torque converter main body 5 from the first port 18 and the third port 20 and operating oil is discharged from the second port 19. The operating oil supplied from the first port 18 and passing through the oil passages 16c and 82 flows radially outward through the region of the space 8 existing axially between the front cover 11 and the piston 75. The operating oil flows along both axially facing sides of the friction coupling part 74a of the drive plate 74 and finally into the fluid operating chamber 6.

As a result, the piston 75 moves toward the turbine because the oil pressure in the space 8 becomes higher than the oil pressure in the fluid operating chamber 6 and because of the pressing force of the arm parts 79b of the return plate 79. The piston 75 stops when it touches against the limiting part 78e of the piston pilot 78 of the piston coupling mechanism 76. When the lockup device is in this released state, torque transmission between the front cover 11 and the turbine 22 is accomplished by the fluid drive between the impeller 21 and the turbine 22.

When in this state, there are cases when oil pressure changes within the torque converter 1 cause a force directed toward the front cover 11 to act on the piston 75. In such cases, it is difficult for the piston 75 to move toward the engine because the return plate 79 applies a force directed away from the front cover 11.

When the speed ratio of the torque converter 1 increases and the input shaft reaches a prescribed rotational speed, the operating oil inside the space 8 is discharged through the first port 18. As a result, the oil pressure inside the fluid operating chamber 6 becomes higher than the oil pressure inside the space 8 and the piston 75 moves toward the engine. The pressing part 75a of the piston 75 presses the friction coupling part 74a of the drive plate 74 against the friction surface 11b of the front cover 11. In this state, since the piston 75 rotates integrally with the front cover 11 due to the piston coupling mechanism 76, torque is transmitted from the front cover 11 to the drive plate 74. Meanwhile, the arm parts 79b of the return plate 79 of the piston coupling mechanism 76 are deformed elastically in the axial direction. The torque of the front cover 11 is transmitted from the driven plate 72, which is mated with the drive plate 74 such that it cannot rotate relative thereto, to the turbine 22 through the torsion springs 73 and, thus, the torque of the front cover 11 is delivered directly to the input shaft (not shown) through the turbine 22. The torsion springs 73 are compressed between the rotationally facing end parts of the claw parts 74b of the drive plate 74 and the rotationally facing end parts of the first claw parts 72b of the driven plate 72 due to the relative rotation of the drive plate 74 and the driven plate 72.

Now, since the oil pressure in the fluid operating chamber 6 is higher than the oil pressure in the space 8, the operating oil flows from the outer circumferential part of the fluid operating chamber 6 toward the space 8 as indicated by arrows A, B, and C in FIG. 7. More specifically, the arrow A indicates the flow of operating oil toward the piston 75 through the space existing radially between the cylindrical part 71*b* of the spring holder 71 and the outer cylindrical part 11*a* of the front cover 11. The arrow B indicates the flow of operating oil toward the piston 75 through slit holes 71*d* and oil holes 71*e* of the spring holder 71. The arrow C indicates the flow of operating oil radially inward along the front cover side of the turbine shell 30 and toward the piston 75 through the second oil holes 72*f* of the driven plate 72. Thus, the amount of operating oil flowing toward the piston 75, particularly the pressing part 75*a*, is increased due to the slit holes 71*d* and oil holes 71*e* provided in the spring holder 71.

Since at least a portion of each slit hole 71*d* is positioned more radially inward than the corresponding claw part 74*b* of the drive plate 74, it is more difficult for the operating oil that passes through the slit holes 71*d* to flow radially outward beyond the claw parts 74*b*. Consequently, the operating oil that passes through the slit holes 71*d* flows toward the pressing part 75*a* of the piston 75 and contributes to improving the lockup response.

Since friction facings 74*c* are attached to both surfaces of the friction coupling part 74*a* of the drive plate 74, the torque transmission capacity is larger than that of a lockup device having only one friction surface.

(4) Installation of the Torsion Springs

Figure 8:
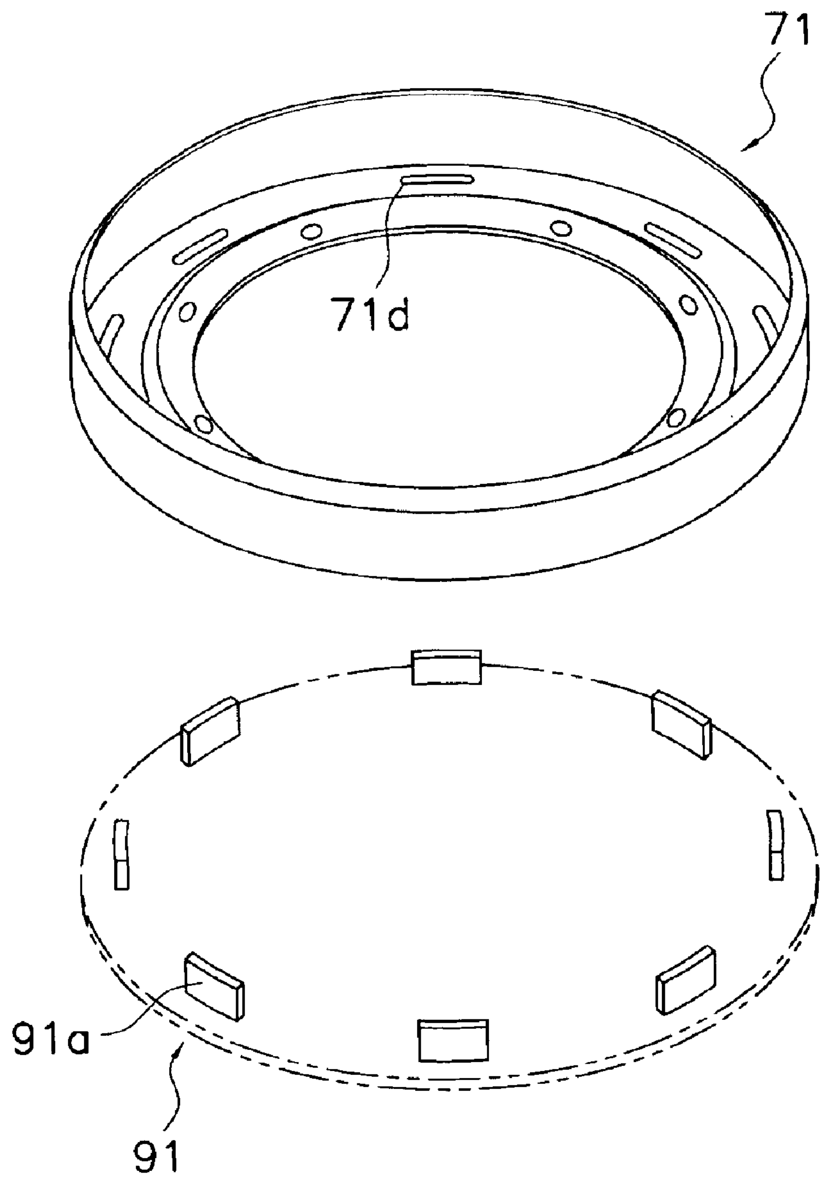
FIG. 8 is a perspective view of the spring holder and a spring installation tool.

The installation of the torsion springs 73 will now be described using FIGS. 8 to 13. FIG. 8 is a perspective view of the spring holder 71 and the spring installation tool 91, and FIGS. 9 to 13 illustrate the procedure of installing the torsion springs 73 into the spring holder 71 and driven plate 72.

First the spring installation tool 91 is explained. The spring installation tool 91 allows the torsion springs 73 to be arranged in the spaces existing rotationally between the slit holes 71*d* of the spring holder 71 when the torsion springs 73 are being arranged in the spring holder 71.

Figure 11:
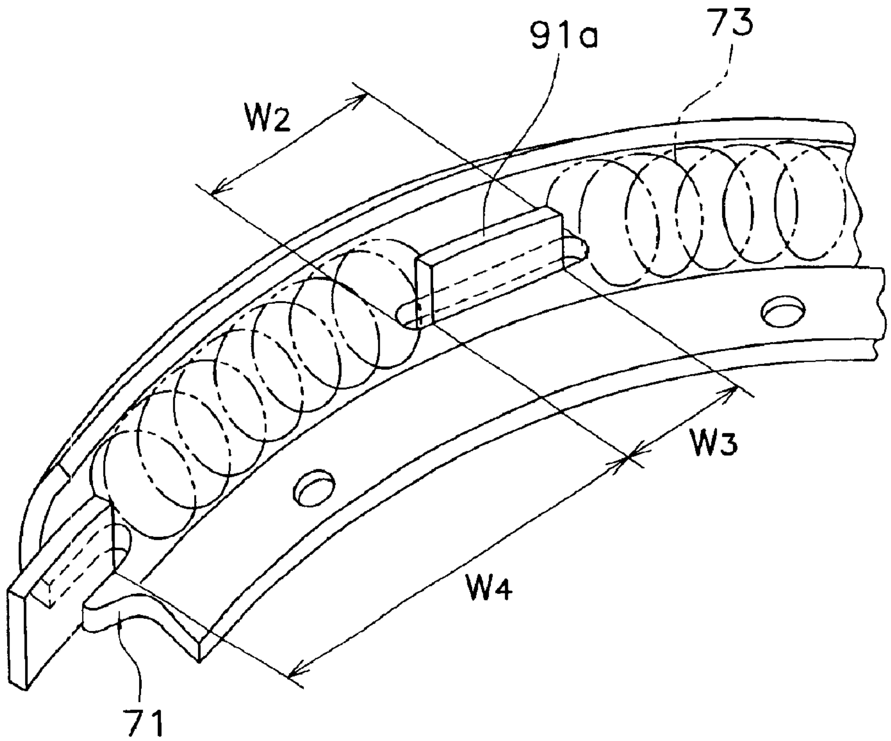
FIG. 11 is a perspective view of the spring holder, spring installation tool, and torsion spring further illustrating the procedure of installing the torsion springs into the spring holder and driven plate.

The spring installation tool 91 has a plurality of claw parts 91*a* provided so as to correspond to the slit holes 71*d*. The claw parts 91*a* are shaped in such a manner that they can pass through the slit holes 71*d*. As shown in FIGS. 4 and 11, the rotational direction widths W3 of the claw parts 91*a* are larger than the rotational direction widths W2 of the first claw parts 72*b* of the driven plate 72 and smaller than the rotational direction widths W1 of the slit holes. The shape of the main body of the spring installation tool 91 is not limited to that shown in FIG. 8; any shape is acceptable so long as it has a plurality of claw parts 91*a* that correspond to the slit holes 71*d*.

Next, the method of installing the torsion springs 73 will be explained. The spring installation method has the following steps: a rotary member preparation step, a hole forming step, a tool preparation step, a tool inserting step, a spring arranging step, a spring supporting step, and a fixing step.

In the rotary member preparation step, the spring holder 71, the driven plate 72, the torsion springs 73, and the drive plate 74 are prepared. The plurality of slit holes 71*d* is formed in the annular part 71*a* of the spring holder 71 in the hole forming step.

In the tool preparation step, a spring installation tool 91 having a plurality of claw parts 91*a* is prepared.

Figure 9:
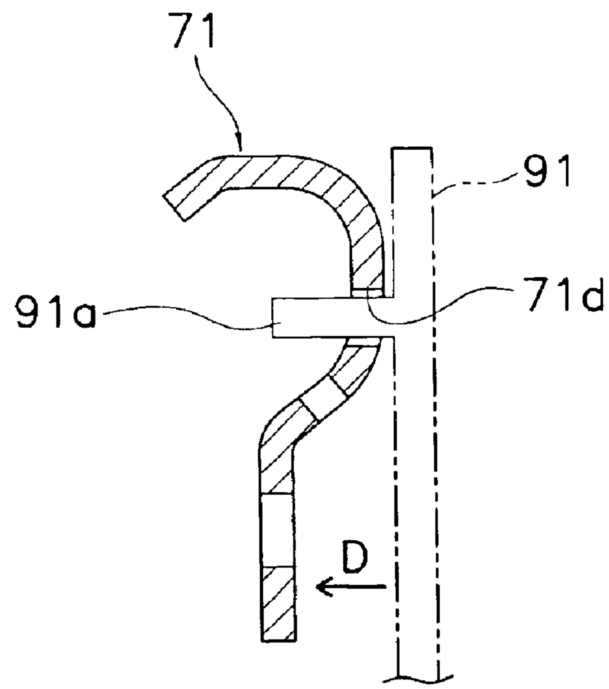
FIG. 9 is a partial cross-sectional view of the spring holder and spring installation tool illustrating a procedure in accordance with the present invention for installing the torsion springs into the spring holder and driven plate.

In the tool inserting step, the claw parts 91*a* of the spring installation tool 91 are inserted into the slit holes 71*d* in the direction of the arrow D as shown in FIG. 9 such that the torsion springs 73 can be arranged in the spring holder 71.

Figure 10:
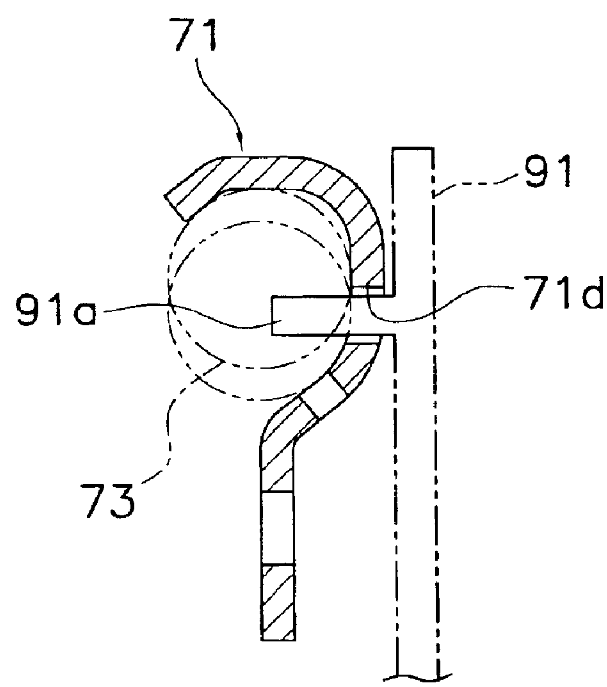
FIG. 10 is a partial cross-sectional view of the spring holder, spring installation tool, and torsion spring illustrating the procedure for installing the torsion springs into the spring holder and driven plate.

In the spring arranging step, as shown in FIG. 10, the torsion springs 73 are arranged between the claw parts 91*a* of the spring installation tool while the claw parts 91*a* remain inserted through the slit holes 71*d* of the spring holder 71. As shown in FIG. 11, the rotational direction spacing W4 between the claw parts 91*a* is slightly smaller than the free length of the torsion springs 73 and, thus, the torsion springs 73 are slightly compressed when they are arranged between the claw parts 91*a*.

Figure 12:
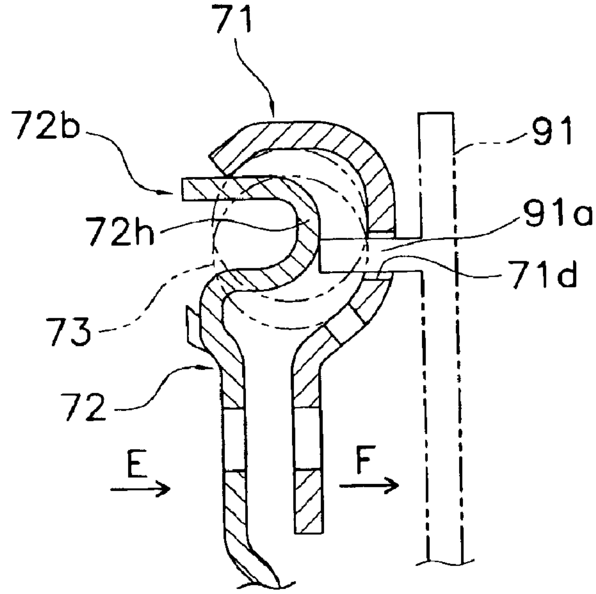
FIG. 12 is a partial cross-sectional view of the spring holder, spring installation tool, torsion spring, and driven plate even further illustrating the procedure of installing the torsion springs into the spring holder and driven plate.
Figure 13:
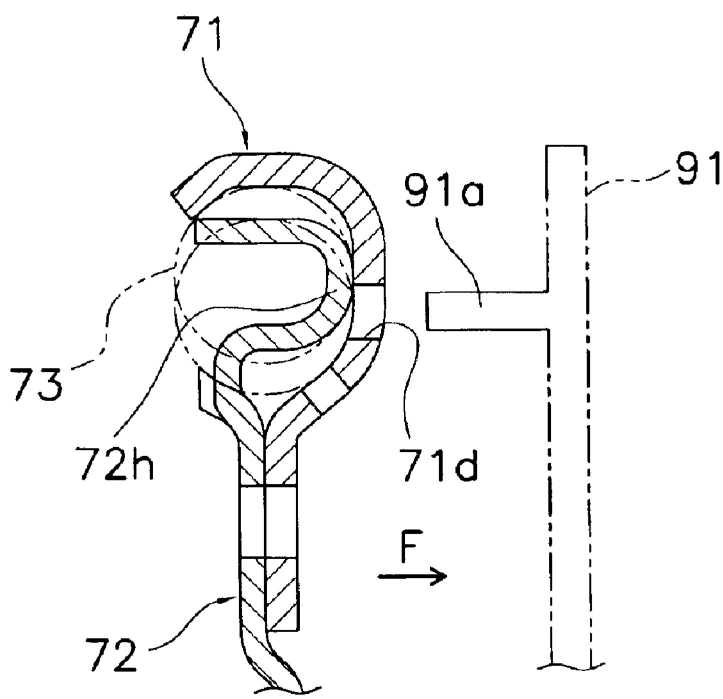
FIG. 13 is a partial cross-sectional view of the spring holder, spring installation tool, torsion spring and driven plate still further illustrating the procedure of installing the torsion springs into the spring holder and driven plate.

In the spring supporting step, as shown in FIGS. 12 and 13, the driven plate 72 is moved toward the spring holder in the direction of the arrow E while the claw parts 91*a* of the spring installation tool 91 are removed from the slit holes 71*d* in the direction of the arrow F. More specifically, the first claw parts 72*b* of the driven plate 72 are arranged so as to support the rotationally facing ends of the torsion springs 73 by pressing the second annular parts 72*h* of the first claw parts 72*b* of the driven plate 72 against the tip ends of the claw parts 91*a* of the spring installation tool 91 while removing the claw parts 91*a* from the slit holes 71*d*. This work can be performed smoothly because the rotational direction widths W1 of the first claw parts 72*b* of the driven plate 72 are smaller than the rotational direction widths W3 of the claw parts 91*a* of the spring installation tool 91.

In the fixing step, which is performed after the spring supporting step, the spring holder 71 is fixed to the driven plate 72 with rivets 77 as shown in FIG. 2. After the fixing step, the torsion springs 73 are supported by the tapered cylindrical part 71*c* of the spring holder 71 and the second claw parts 72*c* of the driven plate 72 in such a manner that they will not fall out.

In this way, the torsion springs 73 can be installed without increasing the number of component parts of the elastic coupling mechanism and without providing notches or cut-and-raised parts in the spring holder 71 for supporting the rotationally facing end parts of the torsion springs 73.

(5) Assembly of the Piston Coupling Mechanism

Figure 14:
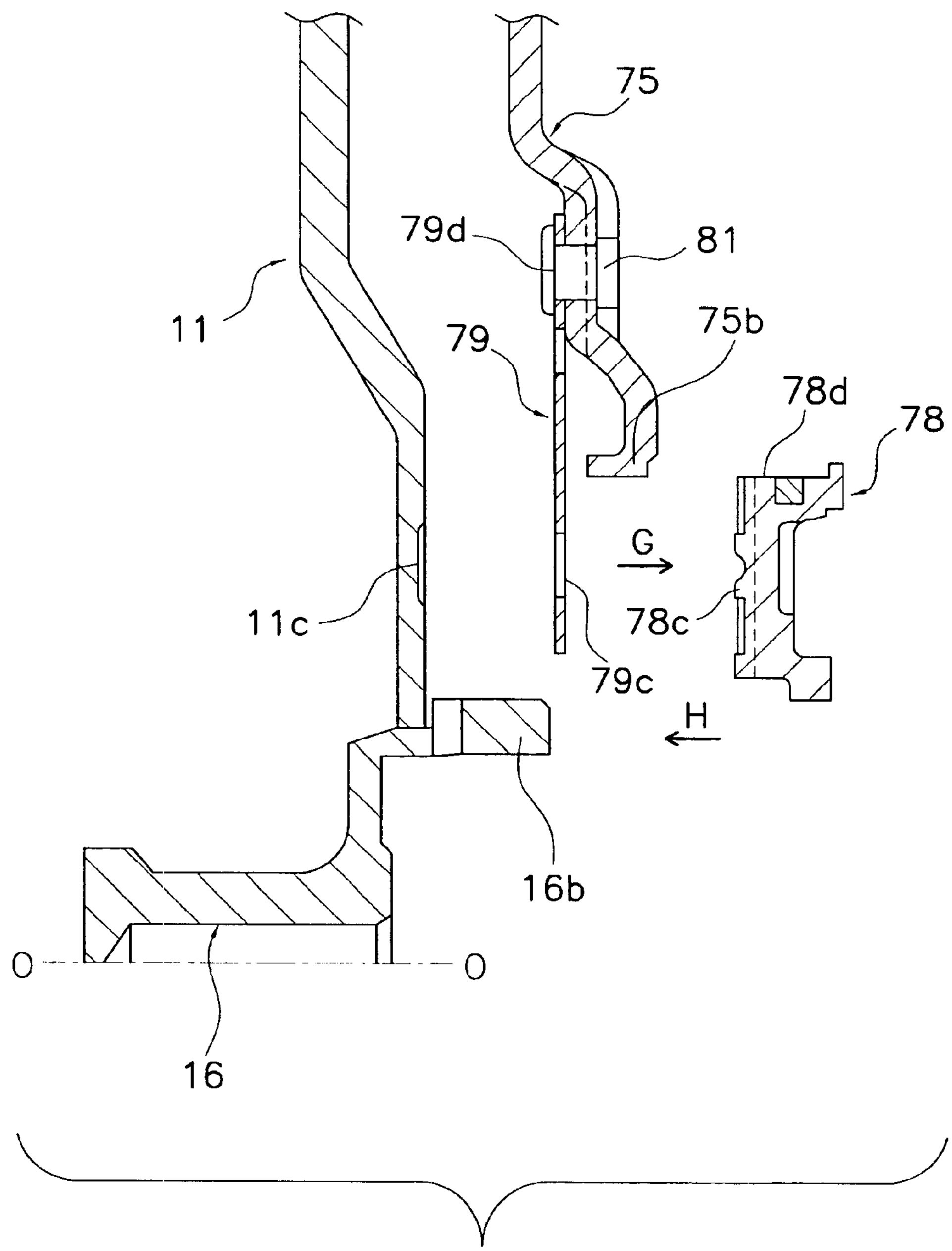
FIG. 14 is a partial cross-sectional view of a front cover, a piston, and a piston pilot illustrating a procedure in accordance with the first preferred embodiment of the present invention for attaching the piston and a piston coupling mechanism to the front cover.

The assembly of the piston coupling mechanism 76 will now be described using FIG. 14. FIG. 14 illustrates the procedure for attaching the piston and the piston coupling mechanism 76 to the front cover 11.

As shown in FIG. 14, the outer circumferential part of the return plate 79 (more specifically, the second fixing holes 79*d*) is fixed to the piston 75 with rivets 81.

Next, the piston 75 with the return plate 79 fixed thereto is moved in the direction of the arrow G and attached to the piston pilot 78. More specifically, the second protruding parts 78*c* of the piston pilot 78 are passed through the first fixing holes 79*c* of the return plate 79 and the inside circumferential surface of the cylindrical part 75*b* of the piston 75 is fitted over the outside circumferential surface of the piston support part 78*d* of the piston pilot 78.

Next, the assemblage having the piston 75, the return plate 79, and the piston pilot 78 is moved in the direction of the arrow H and attached to the assemblage having the front cover 11 and the center boss 16, the center boss 16 being fixed by welding or the like to an inner circumferential part of the front cover 11. More specifically, the tip ends of the second protruding parts 78*c* of the piston pilot 78 are inserted into the recessed parts 11*c* of the front cover 11 so that the two assemblages cannot rotate relative to each other and the inside circumferential surface of the piston pilot 78 fits over the outside circumferential surface of the turbine-side cylindrical part 16*b* of the center boss 16. Finally, the piston pilot 78 is fixed by welding or the like to the turbine-side cylindrical part 16*b*, thus completing the assemblage of the piston coupling mechanism 76 to the front cover 11. In this way, the return plate 79 is fixed so as to be sandwiched axially between the front cover 11 and the piston pilot 78.

With this piston coupling mechanism 76, the return plate 79 can be fixed to the front cover 11 by sandwiching an inner circumferential part of the return plate 79 axially between the front cover 11 and the piston pilot 78. As a result, fewer rivets, bolts, and other fastening members can be used and the number of parts can be reduced. Thus, the structure can be simplified and assembly can be accomplished with ease.

Since the first fixing holes 79*c* of the return plate 79 can engage with the second protruding parts 78*c* of the piston pilot 78, the return plate 79 can be attached to the front cover 11 while engaged with the piston pilot 78. As a result, the assembly is even easier.

Furthermore, by inserting the tips of the second protruding parts 78*c* of the piston pilot 78 into the recessed parts 11*c* of the front cover 11, the piston pilot 78 can be positioned properly when it is fixed to the front cover 11 (more specifically, when it is fixed by welding or the like to the center boss 16). As a result, the assembly work can be performed more efficiently.

Second Embodiment

A second preferred embodiment will now be explained. In view of the similarity between the first and second embodiments, the parts of the second embodiment that are identical to the parts of the first embodiment may be given the same reference numerals as the parts of the first embodiment. Moreover, the descriptions of the parts of the second embodiment that are identical to the parts of the first embodiment may be omitted for the sake of brevity.

A second embodiment of the present invention will now be described based on the drawings.

(1) Structure of the Lockup Device

Figure 15:
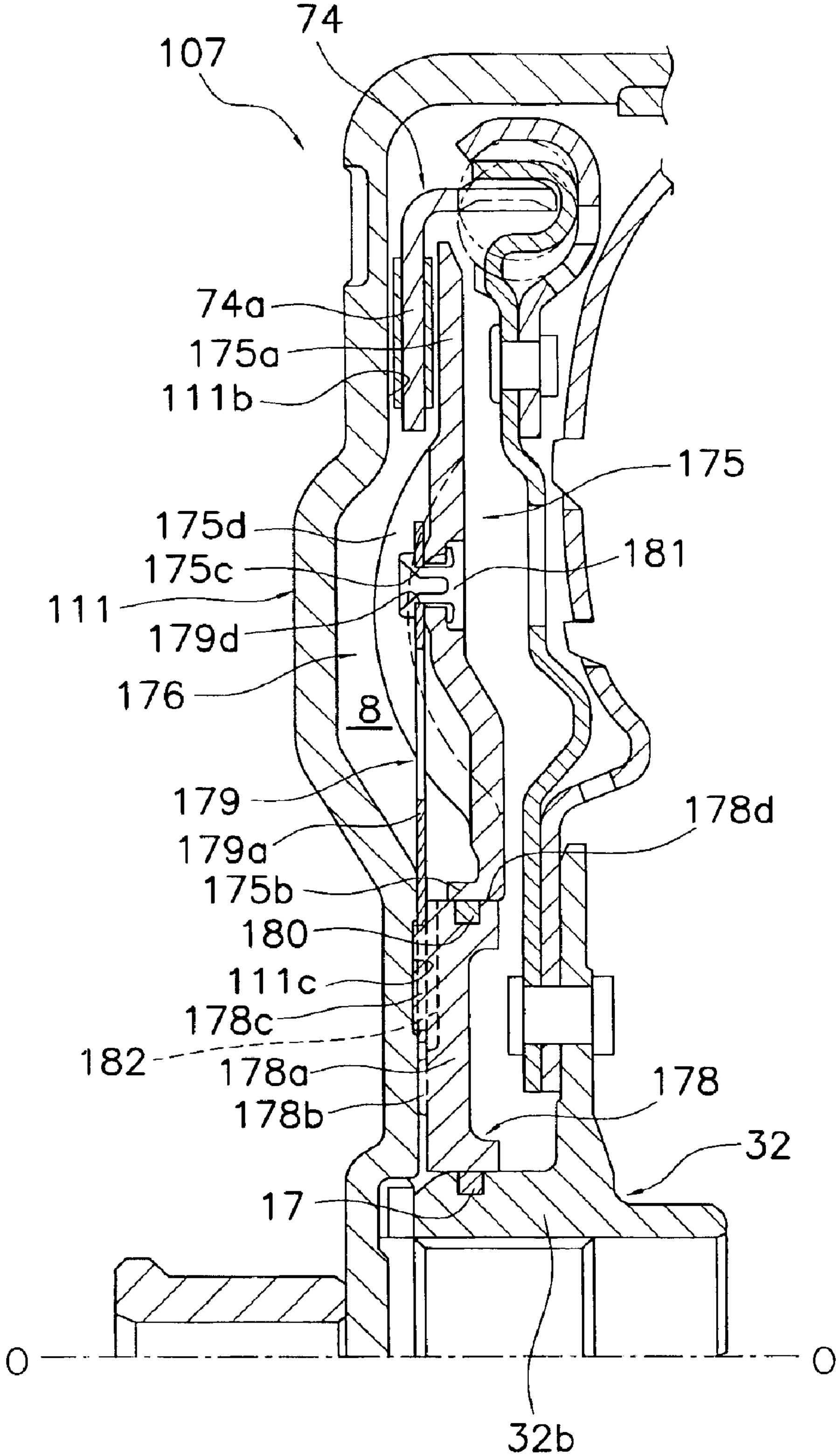
FIG. 15 is a vertical cross-sectional schematic view of a lockup device in accordance with a second preferred embodiment of the present invention.
Figure 16:
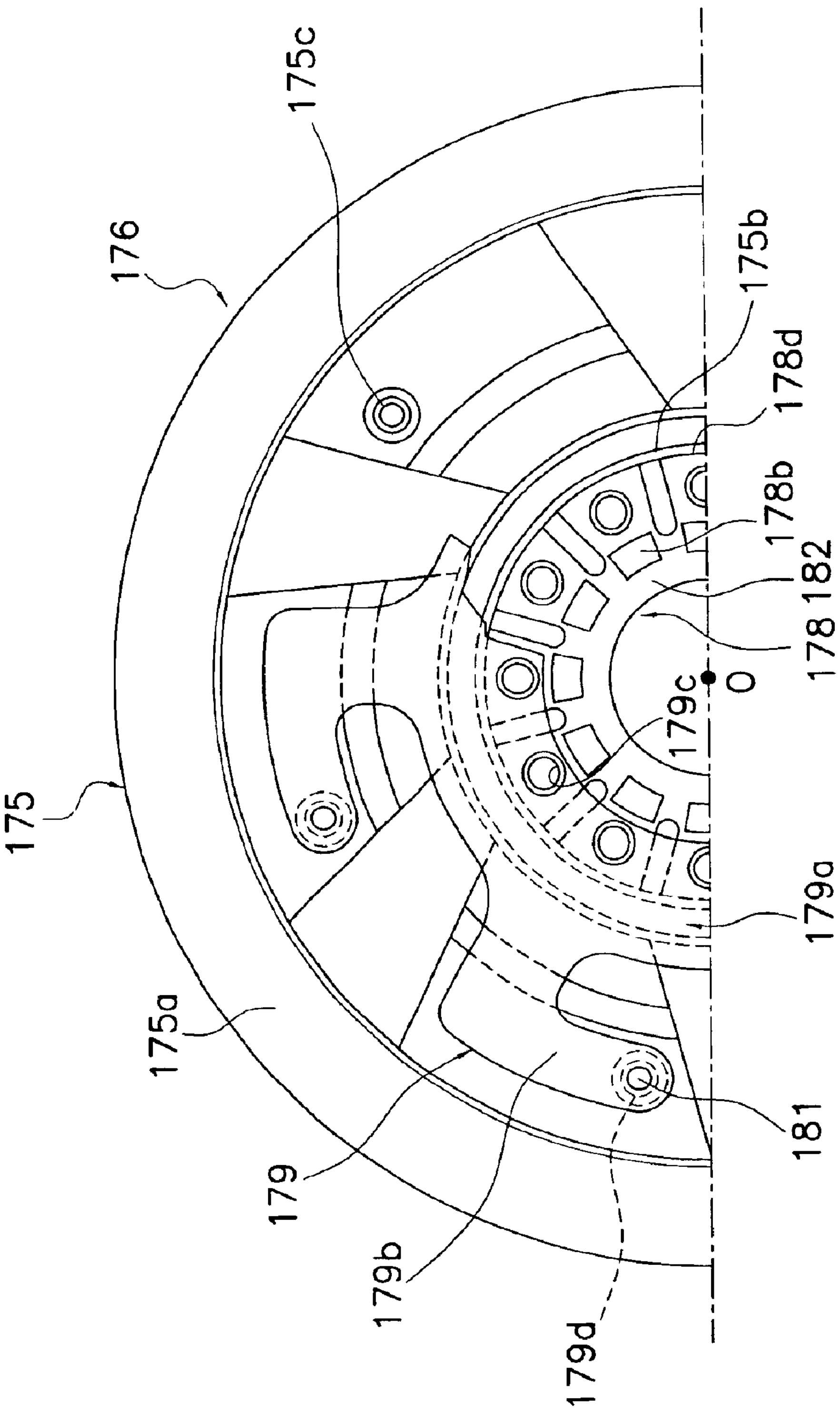
FIG. 16 is a partial elevational view showing a piston and piston coupling mechanism with portions removed for illustrative purposes in accordance with the second preferred embodiment as viewed from the front cover side.

Referring to FIGS. 15 and 16, the lockup device 107 of this embodiment is the same as or substantially the same as the lockup device 7 of the previous embodiment except for the structure of the piston 175 and the structure of the piston coupling mechanism 176. The structures of the piston 175 and the piston coupling mechanism 176 of the lockup mechanism 107 will be described primarily using FIGS. 15 and 16. FIG. 15 is a vertical cross-sectional schematic view of the lockup device 107 in accordance with the second embodiment. FIG. 16 shows the piston 175 and piston coupling mechanism 176 as viewed from a front cover 111 side.

1. Piston

The piston 175 is a circular disc-shaped member having a center hole. The piston 175 is arranged around the outside of a piston pilot 178 (discussed later). The outer circumferential part of the piston 175 forms a pressing part 175*a*. The pressing part 175*a* is an annular portion having a flat surface on the side that faces the front cover 111 and is arranged on the turbine side of the friction coupling part 74*a* of the drive plate 74, similar to the first embodiment. A cylindrical part 175*b* that extends toward the front cover is formed on the inside circumferential part of the piston 175. Formed in a radially intermediate section of the piston 175 are a plurality (six in this embodiment) of fixing holes 175*c* arranged along a rotational direction and a plurality of wing-shaped protruding parts 175*d* arranged rotationally between the fixing holes 175*c* and protruding toward the front cover. The protruding parts 175*d* serve to agitate the operating oil in the portion of the space 8 existing between the front cover 111 and the piston 175 and make it possible for the operating oil in that portion to flow smoothly outward in the radial direction. This arrangement has the effect of reducing the drag torque between the pressing part 175*a* of the piston 175, the friction coupling part 74*a*, and the friction surface 111*b* of the front cover 111.

2. Piston Coupling Mechanism

Similar to the first embodiment, the piston coupling mechanism 176 has a piston pilot 178 and a return plate 179.

In this embodiment, the piston pilot 178 is an annular member arranged on the outside circumferential surface of the boss part 32*b* of the turbine hub 32 such that it can slide on the seal ring 17. The piston pilot 178 has an annular main body part 178*a*, a plurality of first protruding parts 178*b*, a plurality of second protruding parts 178*c*, and a piston support part 178*d*. The plurality (twelve in this embodiment) of first protruding parts 178*b* is fixed to the turbine-side surface of the front cover 111 by projection welding, spot welding, or other means. The plurality (twelve in this embodiment) of second protruding parts 178*c* is provided to the radial outside of the first protruding parts 178*b* and protrudes toward the front cover. The piston support part 178*d* is formed on the outside circumferential part of the main body part 178*a* and serves to support the cylindrical part 175*b* of the piston 175. Recessed parts 111*c* into which the second protruding parts 178*c* can be inserted are formed in the turbine-side surface of the front cover 111 at positions corresponding to the second protruding parts 178*c*.

Also, a seal ring 180 is provided on the portion of the piston support part 178*d* that supports the cylindrical part 175*b* of the piston 175 and functions to prevent the operating oil from flowing between the front cover side and the turbine side of the piston 175 within the space 8. As a result, the piston 175 is supported by the piston pilot 178 such that it can move in the axial direction.

The return plate 179 is an annular plate member similar to that in the first embodiment and has an annular part 179*a* and a plurality of arm parts 179*b* formed on the outside circumferential edge of the annular part 179*a*.

First fixing holes 179*c* into which the second protruding parts 178*c* of the piston pilot 178 can fit are formed in an inner circumferential part of the annular part 179*a*. In this embodiment, the first fixing holes 179*c* are made slightly smaller than the diameter of the second protruding parts 178*c* so that the second protruding parts 178*c* are press-fitted therein.

The arm parts 179*b* are arranged along a rotational direction and have arc-shaped portions that extend radially outward from the outside edge of the annular part 179*a* and then extend in a rotational direction. Second fixing holes 179*d* that correspond to the fixing holes 175*c* of the piston 175 are provided in the rotationally facing end parts of the arm parts 179*b*. The piston 175 and the return plate 179 are fixed together with rivets 181 at the fixing holes 175*c* and the second fixing holes 179*d*. The rivets 181 are preferably blind rivets that can be set from the turbine side of the piston 175. Thus, the return plate 179 is fixed at an outer circumferential part thereof to the piston 175 and an inner circumferential part thereof is fixed so as to be sandwiched axially between the front cover 111 and the piston pilot 178.

Similarly to the first embodiment, when the return plate 179 is interposed axially between the front cover 111 and the piston pilot 178, the first protruding parts 178*b* form oil passages 182 that extend radially.

(2) Assembly of the Piston Coupling Mechanism

Figure 17:
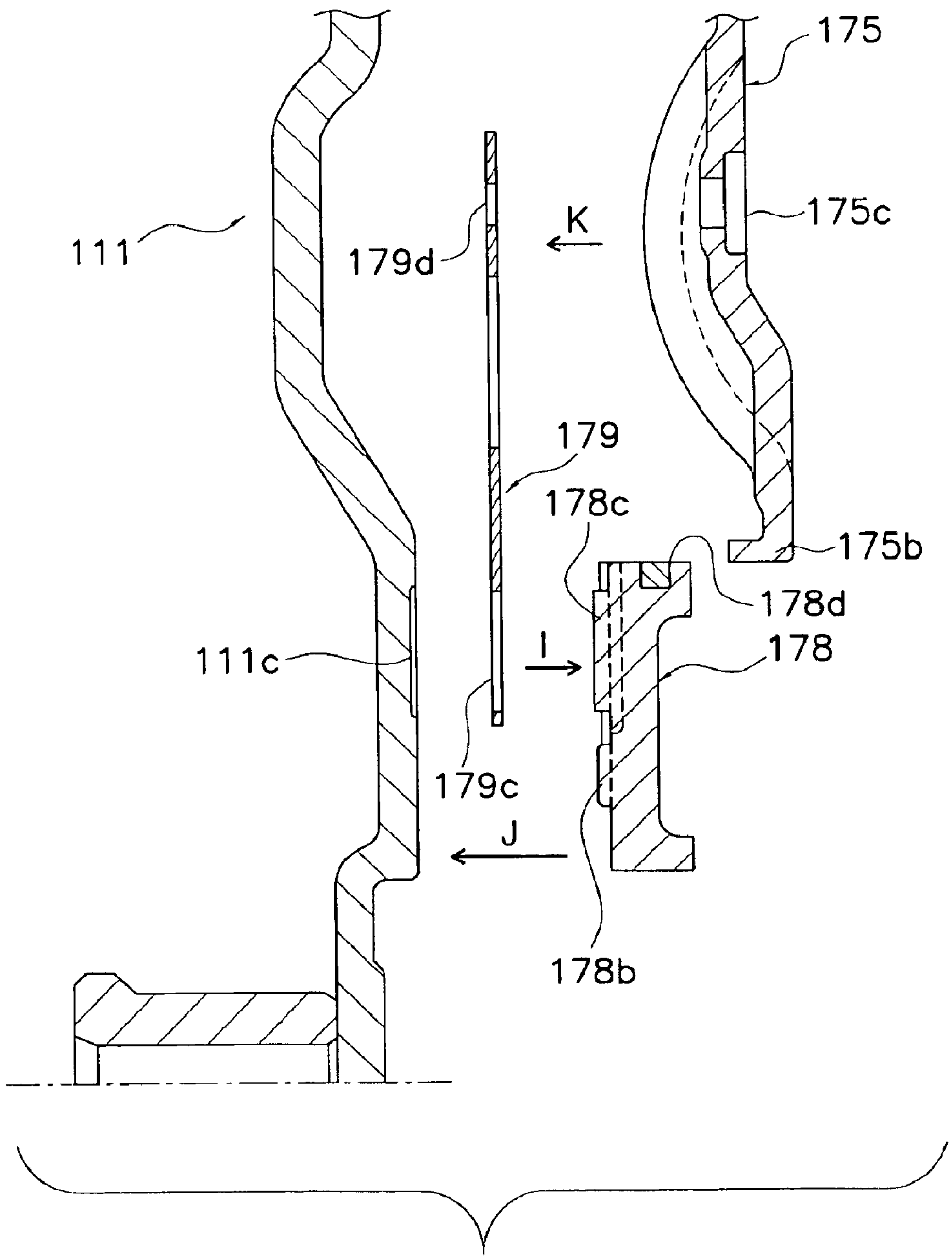
FIG. 17 is a cross-sectional view of components illustrating a procedure for attaching the piston and the piston coupling mechanism to the front cover in accordance with the second preferred embodiment.

The assembly of the piston coupling mechanism 176 will now be described using FIG. 17. FIG. 17 illustrates the procedure for attaching the piston and the piston coupling mechanism 176 to the front cover 111.

As shown in FIG. 17, the return plate 179 is moved in the direction of the arrow I and attached to the piston pilot 178.

More specifically, the second protruding parts 178c of the piston pilot 178 are passed through the first fixing holes 179c of the return plate 179.

Next, the assemblage having the return plate 179 and the piston pilot 178 is moved in the direction of the arrow J and fixed to the turbine side of the front cover 111. More specifically, the tip ends of the second protruding parts 178c of the piston pilot 178 are inserted into the recessed parts 111c of the front cover 111 so that the assemblage and the front cover 111 cannot rotate relative to each other. Then, the first protruding parts 178b of the piston pilot 178 are fixed to the turbine-side surface of the front cover 111 by projection welding or spot welding such that the piston pilot 178 is fixed to the front cover 111. In this way, the return plate 179 is fixed so as to be sandwiched axially between the front cover 111 and the piston pilot 178.

Next, the piston 175 is moved toward the front cover 111 in the direction of the arrow K and fitted onto the piston support part 178d of the piston pilot 178.

Finally, the piston 175 is fixed to the return plate 179 with rivets 181, which are blind rivets.

The assembly method for the piston coupling mechanism 176 is similar to the first embodiment in that the return plate 179 is fixed so as to be interposed axially-between the front cover 111 and the piston pilot 178. The fact that the return plate 179 can be attached to the piston pilot 178 is also similar to the first embodiment.

In this embodiment, blind rivets are preferably used for the rivets 181 instead of normal rivets. Consequently, except for attaching the return plate 179 to the piston pilot 178, each member can be attached to the front cover 111 in sequence and, thus, the assembly performance is excellent.

Meanwhile, unlike the first embodiment, this embodiment is not provided with a limiting part that limits the range of axial movement of the piston 175 and the piston 175 can be removed by merely removing the rivets 181. This features allows the piston 175 to be removed easily in the event that trouble occurs in the lockup device 107 and it is necessary to disassemble the lockup device 107.

Figure 18:
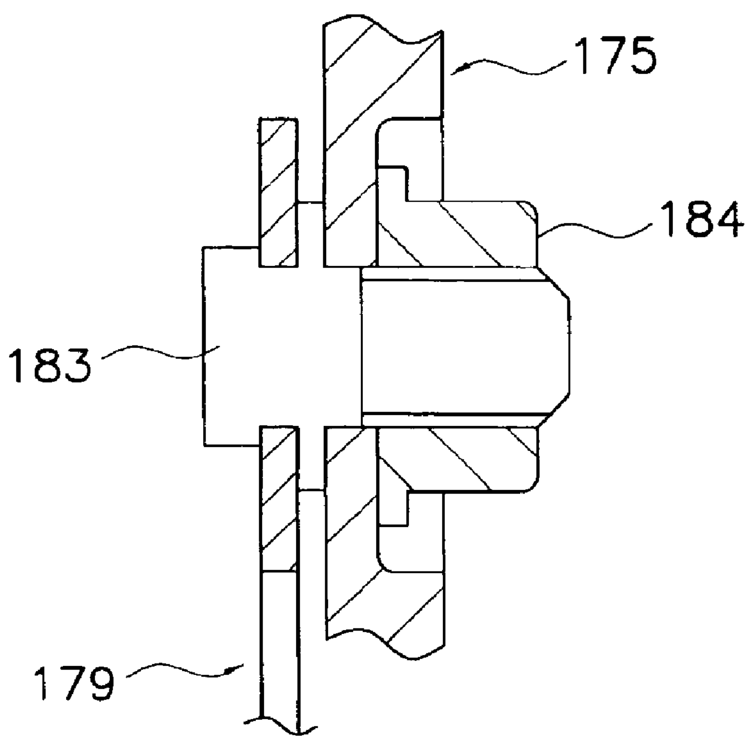
FIG. 18 illustrates a method of fixing the piston and return plate together using a pin and sleeve.

However, it is also acceptable to use a different method to fix the piston 175 and the return plate 179 together instead of using rivets 181. As shown in FIG. 18, it is also acceptable to use a pin and sleeve method in which pins 183 that are fixed in the second fixing holes of the return plate 179 are passed through the fixing holes 175c of the piston 175 toward the turbine and sleeves 184 are fitted over the ends of the pins 183 and crimped onto the outside circumference of the pins 183. In such a case, the same effects are obtained as when blind rivets are used.

Other Embodiments

Although embodiments of the present invention have been described heretofore based on the drawings, the basic constitution of the invention is not limited to these embodiments. Various modifications can be made without deviating from the gist of the invention.

(1) In the first and second embodiments, the present invention was applied to a torque converter, but the invention can also be applied to a fluid coupling or other fluid-type torque transmission device.

(2) In the first and second embodiments, the spring holder is fixed to the driven plate, but the invention can also be applied to a structure in which the spring holder is fixed to the drive plate.

(3) Instead of the engaging method used in the embodiments, the engagement between the return plate and the piston pilot can also be accomplished using lugs or some other engaging method.

(4) In the first and second embodiments, protruding parts are formed on the piston pilot and recessed parts are formed in the front cover, but it is also acceptable to form the protruding parts on the front cover and the recessed parts in the piston pilot.

Effects of the Invention

As described previously, the present invention allows the coupling member to be fixed to the front cover by sandwiching the second fixing part of the coupling member axially between the front cover and the piston support member. As a result, the number of rivets, bolts, and other fastening members can be decreased and the assembly performance of the piston coupling mechanism can be improved.

Also, with the present invention, a lockup device having two friction surfaces can be achieved in which a mere coupling member enables the piston to move in the axial direction and torque to be transmitted between the front cover and the piston. Consequently, unlike conventional piston coupling mechanisms, it is not necessary to construct the coupling member out of a plurality of flat springs and it is not necessary to provide a base plate to fix the flat springs to the front cover. As a result, the structure of the piston coupling mechanism can be simplified.

Furthermore, with the present invention, the springs can be installed using a plurality of positioning holes provided in the first rotary member. As a result, the springs can be assembled without increasing the number of component parts of the elastic coupling mechanism and without providing notches or cut-and-raised parts on the first rotary member for supporting the rotationally facing ends of the springs.

"Means plus function" clauses as utilized in the specification and claims should include any structure or hardware and/or algorithm that can be utilized to carry out the function of the "means plus function" clause.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The terms of degree such as "substantially,""about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application Nos. 2002-278885, 2002-278886, and 2002-278887. The entire disclosures of Japanese Patent Application Nos. 2002-278885, 2002-278886, and 2002-278887 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A fluid-type torque transmission device comprising:

a front cover having a friction surface;

an impeller being fixed to said front cover and forming a fluid chamber to be filled with an operating fluid;

a turbine being arranged within said fluid chamber to face axially said impeller, and a lockup device comprising, a plurality of springs being arranged along a rotational direction between said front cover and said turbine, said plurality of springs being configured to deform elastically in the rotational direction, said plurality of springs being movable in the rotational direction, a first rotary member being disposed on a turbine side of said plurality of springs, said first rotary member being configured to support said plurality of springs, said first rotary member having a first axial support part and supporting a turbine side of said springs, and a first radially outside support part being configured to support a radially outward facing side of said springs, a second rotary member being fixed to said first rotary member and said turbine and having a plurality of second rotational direction support parts being disposed rotationally between said springs and support rotationally facing ends of said springs, a third rotary member being provided to be rotatable relative to said first and second rotary members, said third rotary member having a friction coupling part axially facing said friction surface and a plurality of third rotational direction support parts being configured to support said rotationally facing ends of said plurality of springs, and a piston being disposed on a turbine side of said friction coupling part, said piston being configured to couple non-rotatably and axially movable to said front cover, said piston being configured to press said friction coupling part against said friction surface, said first and second rotary members being configured to support a radially inward facing side of said plurality of springs and a front cover side of said springs, and said first axial support part having a plurality or positioning holes being formed in rotational positions corresponding to said second rotational direction support parts and having rotational direction lengths being larger than rotational direction widths of said second rotational direction support parts.

2. The fluid-type torque transmission device according to claim 1, wherein said third rotational direction support parts extend toward said turbine from a radially outward facing edge of the friction coupling part, and said positioning holes are arranged such that at least a portion thereof is positioned more radially inward than the radial position of said third rotational direction support parts.

3. The fluid-type torque transmission device according to claim 2, wherein said first rotary member has a communication hole formed in a position more radially inward than the radial position of said third rotational direction support parts.

4. The fluid-type torque transmission device according to claim 2, wherein said third rotational direction support parts engage with said second rotary member in such that they cannot move in the radial direction.

5. The fluid-type torque transmission device according to claim 1, wherein said first rotary member has a communication hole formed in a position more radially inward than the radial position of said third rotational direction support parts.

6. The fluid-type torque transmission device according to claim 1, wherein said third rotational direction support parts engage with said second rotary member in such that they cannot move in the radial direction.

* * * * *